(12) United States Patent
Gentry

(10) Patent No.: US 9,716,590 B2
(45) Date of Patent: *Jul. 25, 2017

(54) FULLY HOMOMORPHIC ENCRYPTION

(71) Applicant: International Business Machines Corporation, Armonk, NY (US)

(72) Inventor: Craig B. Gentry, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/740,354

(22) Filed: Jun. 16, 2015

(65) Prior Publication Data

US 2015/0358153 A1    Dec. 10, 2015

Related U.S. Application Data

(63) Continuation of application No. 13/458,518, filed on Apr. 27, 2012, now Pat. No. 9,083,526.

(60) Provisional application No. 61/481,048, filed on Apr. 29, 2011.

(51) Int. Cl.
*H04L 9/28* (2006.01)
*H04L 9/00* (2006.01)

(52) U.S. Cl.
CPC ............... *H04L 9/28* (2013.01); *H04L 9/008* (2013.01)

(58) Field of Classification Search
CPC .................................. H04L 9/28; H04L 9/008
See application file for complete search history.

(56) References Cited

U.S. PATENT DOCUMENTS

| | | | |
|---|---|---|---|
| 4,405,829 A | 9/1983 | Rivest et al. | 380/30 |
| 5,495,532 A | 2/1996 | Killian et al. | 380/30 |
| 6,530,020 B1 | 3/2003 | Aoki | |
| 7,054,444 B1 | 5/2006 | Paillier | 380/30 |
| 7,500,111 B2 | 3/2009 | Hacigumus et al. | 713/193 |

(Continued)

OTHER PUBLICATIONS

"Arithmetic Circuit Complexity—Wikipedia, the free encyclopedia", en.wikipedia.org/wiki/Arithmetic_circuit_complexity, old revision of the page Feb. 17, 2011.*

(Continued)

*Primary Examiner* — Darren B Schwartz
(74) *Attorney, Agent, or Firm* — Harrington & Smith

(57) ABSTRACT

In one exemplary embodiment of the invention, a method and computer program include: receiving first and second ciphertexts having first and second data encrypted per an encryption scheme, the encryption scheme has public/secret keys and encryption, decryption, operation and refresh functions, the encryption function encrypts data, the decryption decrypts ciphertext, the operation receives ciphertexts and performs operation(s) on them, the refresh operates to prevent growth of the magnitude of noise for a ciphertext while reducing the modulus of the ciphertext without using the secret key, utilizing a modulus switching technique that involves transforming a first ciphertext c modulo q into a second ciphertext c' modulo p while preserving correctness, the technique includes scaling by p/q and rounding, p<q; using the operation function(s), performing operation(s) on them to obtain a third ciphertext; and reducing a noise level of the third ciphertext using the refresh function.

25 Claims, 4 Drawing Sheets

(56) References Cited

U.S. PATENT DOCUMENTS

| | | | |
|---|---|---|---|
| 7,640,432 | B2 | 12/2009 | Gennaro et al. |
| 7,856,100 | B2 | 12/2010 | Wang et al. |
| 7,869,598 | B2 | 1/2011 | Kerschbaum |
| 7,877,410 | B2 | 1/2011 | Staddon et al. |
| 8,515,058 | B1 | 8/2013 | Gentry ............................ 380/28 |
| 8,627,107 | B1 | 1/2014 | Kennedy et al. ............. 713/189 |
| 2002/0103999 | A1 | 8/2002 | Camnisch et al. |
| 2002/0164035 | A1 | 11/2002 | Yokota et al. |
| 2003/0056118 | A1 | 3/2003 | Troyansky et al. ........... 713/201 |
| 2003/0172262 | A1 | 9/2003 | Curry |
| 2005/0028009 | A1 | 2/2005 | Neff .............................. 713/201 |
| 2005/0120233 | A1 | 6/2005 | Halcrow et al. |
| 2005/0193048 | A1 | 9/2005 | Vaudenay et al. ............ 708/400 |
| 2006/0015946 | A1 | 1/2006 | Yagawa |
| 2006/0262933 | A1 | 11/2006 | Furukawa |
| 2007/0140479 | A1 | 6/2007 | Wang et al. |
| 2007/0156586 | A1 | 7/2007 | Kerschbaum |
| 2007/0192864 | A1 | 8/2007 | Bryant et al. |
| 2008/0010467 | A1 | 1/2008 | Kerschbaum et al. |
| 2008/0226066 | A1 | 9/2008 | Yi et al. |
| 2008/0294909 | A1 | 11/2008 | Ostrovsky et al. ........... 713/189 |
| 2009/0062942 | A1 | 3/2009 | Smaragdis et al. ............. 700/94 |
| 2009/0103721 | A1 | 4/2009 | Sada et al. ....................... 380/42 |
| 2009/0138459 | A1 | 5/2009 | Walter et al. |
| 2009/0268908 | A1 | 10/2009 | Bikel et al. ................... 380/255 |
| 2009/0327748 | A1 | 12/2009 | Agrawal et al. .............. 713/189 |
| 2010/0329448 | A1 | 12/2010 | Rane et al. ...................... 380/28 |
| 2011/0110525 | A1 | 5/2011 | Gentry ........................... 380/285 |
| 2011/0283099 | A1 | 11/2011 | Nath et al. ..................... 713/150 |
| 2012/0039465 | A1 | 2/2012 | Gentry et al. ................... 380/44 |
| 2012/0039473 | A1 | 2/2012 | Gentry et al. ................. 380/277 |
| 2012/0066510 | A1 | 3/2012 | Weinman ....................... 713/189 |
| 2014/0177828 | A1* | 6/2014 | Loftus ..................... H04L 9/008 380/44 |

OTHER PUBLICATIONS

Klivans, Adam R. & Shpilka, Amir. "Learning Restricted Models of Arithmetic Circuits", Theory of Computing, Sep. 28, 2006, vol. 2, pp. 185-206.*
C.A. Melchor, G. Castagnos, and P. Gaborit. Lattice-based homomorphic encryption of vector spaces. In *IEEE International Symposium on Information Theory, ISIT'2008*, pp. 1858-1862, 2008.
C.A. Melchor, P. Gaborit, and J. Herranz. Additively Homomorphic Encryption with $d$-Operand Multiplications. Technical Report 2008/378, IACR ePrint archive, 2008. Available at http://eprint.iacr.org/2008/378/.
M. Ajtai. Generating Hard Instances of the Short Basis Problem. *ICALP'99*, LNCS 1644, pp. 1-9, 1999.
J. Alwen and C. Peikert. Generating Shorter Bases for Hard Random Lattices. In *STACS*, pp. 75-86, 2009.
D. Boneh, E.-J. Goh, and K. Nissim. Evaluating 2-DNF Formulas on Ciphertexts. (TCC '05, LNCS 3378, pp. 325-341, 2005), 2006.
Y. Dodis, S. Goldwasser, Y. Kalai, C. Peikert, and V. Vaikuntanathan. Public-Key Encryption Schemes with Auxiliary Inputs. In *TCC*, pp. 361-381, 2010.
C. Gentry. *A Fully Homomorphic Encryption Scheme*. Dissertation, Stanford University, 2009. Available at http://crypto.stanford.edu/craig.
C. Gentry. Fully Homomorphic Encryption Using Ideal Lattices. In *Proc. of STOC '09*, pp. 169-178. ACM, 2009.
C. Gentry, C. Peikert, and V. Vaikuntanathan. Trapdoors for Hard Lattices and New Cryptographic Constructions. (In *STOC*, pp. 197-206, 2008), 2007.
A. Kawachi, K. Tanaka, and K. Xagawa. Multi-bit Cryptosystems Based on Lattice Problems. In *Public Key Cryptography (PKC'07)*, LNCS 4450, pp. 315-329. Springer, 2007.
Y. Lindell and B. Pinkas. A Proof of Yao's Protocol for Secure Two-Party Computation. (*J. Cryptology*, 22(2), 2009), 2004.
C. Peikert. Public-Key Cryptosystems from the Worst-Case Shortest Vector Problem. In *STOC'09*, pp. 333-342. ACM, 2009.
O. Regev. On Lattices, Learning with Errors, Random Linear Codes, and Cryptography. *J. ACM*, 56(6), 2009. Preliminary version in *Proc. of STOC '05*, pp. 84-93, 2005.
T. Sander, A. Young, and M. Yung. Non-Interactive CryptoComputing for $NC^1$. In *40th Annual Symposium on Foundations of Computer Science*, pp. 554-567. IEEE, 1999.
A. C. Yao. Protocols for Secure Computations (extended abstract). In *23rd Annual Symposium on Foundations of Computer Science—FOCS '82*, pp. 160-164. IEEE, 1982.
J. Domingo-Ferrer. "A Provably Secure Additive and Multiplicative Privacy Homomorphism." Information Security. 5th International Conference, ISC 2002 Proceedings, pp. 471-483, 2002.
K. Henry. The Theory and Applications of Homomorphic Cryptography. Dissertation, University of Waterloo, 2008.
J. Black, P. Rogaway, T. Shrimpton. Encryption-Scheme Security in the Presence of Key-Dependent Messages. In Proc. of SAC '02, LNCS 2595. Springer, pp. 62-75, 2002.
M. Blaze, G. Bleumer, M. Strauss. Divertible Protocols and Atomic Proxy Cryptography. Eurocrypt '98. LNCS 1403, pp. 127-144, 1998.
D. Boneh, S. Halevi, M. Hamburg, R. Ostrovsky. Circular-Secure Encryption from Decision Diffe-Hellman. In Proc. of Crypto '08, LNCS 5157, pp. 108-125, 2008.
R. Canetti, O. Goldreich, S. Halevi. The Random Oracle Methodology, Revisited. (Extended abstract in *Proc. of the 30th ACM Symp. on Theory of Computing (STOC)*, pp. 209-218, 1998), 2002.
Y. Ishai, A. Paskin. Evaluating Branching Programs on Encrypted Data. In Proc. of TOC '07, 2007.
Homomorphic encryption. Wikipedia, accessed Sep. 30, 2009.
U.S. Appl. No. 12/749,944, Halevi et al., "An Efficient Homomorphic Encryption Scheme for Bilinear Forms", filed Mar. 30, 2010, 61 pgs.
U.S. Appl. No. 12/590,584, Craig B. Gentry, "A Fully Homomorphic Encryption Method Based on a Bootstrappable Encryption Scheme, Computer Program and Apparatus", filed Nov. 10, 2009, 80 pgs.
R. Cramer, I. Damgaard, J.B. Nielsen. Multiparty Computation from Threshold Homomorphic Encryption. In Proc. of Crypto '01, LNCS 2045, pp. 279-298, 2001.
M. Franklin, S. Haber. Joint Encryption and Message-Efficient Secure Computation. J. Cryptology, 9(4), pp. 217-232, 1996.
O. Goldreich, S. Micali, A. Wigderson. How to Play Any Mental Game—A Completeness Theorem for Protocols with Honest Majority. J. of the ACM, vol. 38, No. 1, pp. 691-729, 1991. Preliminary Version in FOCS '86.
O. Goldreich, R Ostrovsky. Software Protection and Simulation on Oblivious RAMs. JACM, 1996.
S. Goldwasser, Y.T. Kalai, G.N. Rothblum. One-Time Programs. In Proc. of Crypto '08. Springer, LNCS 5157, pp. 39-56, 2008.
S. Halevi, H. Krawczyk. Security Under Key-Dependent Inputs. In Proc. of ACM CCS '07, 2007.
F. Armknecht and A.-R Sadeghi. A New Approach for Algebraically Homomorphic Encryption. Cryptology ePrint Archive: Report 2008/422, 2008.
S. Arora, C. Lund, R. Motwani, M. Sudan, and M. Szegedy. Proof Verification and the Hardness of Approximation Problems. J. of the ACM, vol. 45, No. 3, pp. 501-555, 1998.
D. Barrington. Bounded-Width Polynomial-Size Branching Programs Recognize Exactly Those Languages in $NC^1$. In Proc. of STOC '86, pp. 1-5, 1986.
D. Beaver. Minimal-Latency Secure Function Evaluation. In Proc. of Eurocrypt '00, pp. 335-350. Springer, 2000.
J.D.C. Benaloh. Verifiable Secret-Ballot Elections. Ph.D. thesis, Yale Univ., Dept. of Comp. Sci., 1988.
D. Boneh, R. Lipton. Searching for Elements in Black-Box Fields and Applications. In Proc of Crypto '96, LNCS 109, pp. 283-297. Springer, 1996.
E.F. Brickell and Y. Yacobi. On Privacy Homomorphisms. In Proc. of Eurocrypt '87, LNCS 304, pp. 117-125. Springer, 1988.
R. Canetti, S. Hohenberger. Chosen-Ciphertext Secure Proxy Re-Encryption. In Proc. of ACM CCS '07, 2007.

(56) References Cited

OTHER PUBLICATIONS

W. van Dam, S. Hallgren, L. Ip. Quantum Algorithms for some Hidden Shift Problems. In Proc. of SODA '03, pp. 489-498, 2003. Full version in SIAM J. Comput. 36(3): pp. 763-778, 2006.
I. Damgard, M.J. Jurik. A Length-Flexible Threshold Cryptosystem with Applications. ACISP '03, LNCS 2727, pp. 350-356, 2003.
I. Damgard, J.B. Nielsen. Universally Composable Efficient Multiparty Computation from Threshold Homomorphic Encryption. In Proc. of Crypto '03, LNCS 2729, pp. 247-264. Springer, 2003.
M. van Dijk, S. Devadas. Interval Obfuscation. To be published as an MIT-CSAIL Technical Report in 2009.
I.B. Damgard, M.J. Jurik. A Length-Flexible Threshold Cryptosystem with Applications. BRICS Report Series, RS-03-16, ISSN 0909-0878, 2003.
T. ElGamal. A Public Key Cryptosystem and a Signature Scheme Based on Discrete Logarithms. Trans. on Info. Theory, vol. IT-31, No. 4, pp. 469-472, Jul. 1985.
M.R. Fellows, N. Koblitz. Combinatorial Cryptosystems Galore! In Contemporary Mathematics, vol. 168 of Finite Fields: Theory, Applications, and Algorithms, FQ2, pp. 51-61, 1993.
S. Goldwasser, D. Kharchenko. Proof of Plaintext Knowledge for the Ajtai-Dwork Cryptosystem. In Proc. of TCC 2005, pp. 529-555, 2005.
S. Goldwasser, S. Micali. Probabilistic Encryption & How to Play Mental Poker Keeping Secret All Partial Information. In Proc of STOC '82, pp. 365-377, 1982.
J. Kilian. A Note on Efficient Zero-Knowledge Proofs and Arguments. In Proc. of STOC '92, pp. 723-732, 1992.
J. Kilian. Improved Efficient Arguments. In Proc. of Crypto '95, LNCS 963, pp. 311-324, 1995.
F. Levy-dit-Vehel and L. Perret. A Polly Cracker system based on Satisfiability. In Coding, Crypt. and Comb., Prog. in Comp. Sci. and App. Logic, v. 23, pp. 177-192, 2003.
H. Lipmaa. An Oblivious Transfer Protocol with Log-Squared Communication. In Proc. of ICS '05 pp. 314-328, 2005.
L. Van Ly. Polly Two—A Public-Key Cryptosystem based on Polly Cracker, Ph.D. thesis, Ruhr-University at Bochum, Bochum, Germany 2002.
L. Van Ly. Polly two : a new algebraic polynomial-based Public-Key Scheme. AAECC, 17: 267-283, 2006.
U. Maurer, D. Raub. Black-Box Extension Fields and the Inexistence of Field-Homomorphic One-Way Permutations. Asiacrypt '07, pp. 427-443, 2007.
D. Naccache, J. Stern. A New Public Key Cryptosystem Based on Higher Residues. ACM CCS '98, 1998.
T. Okamoto, S. Uchiyama. A New Public-Key Cryptosystem as Secure as Factoring. Eurocrypt '98, LNCS 1403, pp. 308-318, 1998.
P. Paillier. Public-Key Cryptosystems Based on Composite Degree Residuosity Classes. Eurocrypt '99, pp. 223-238, 1999.
C. Peikert, B. Waters. Lossy Trapdoor Functions and Their Applications. STOC '08, pp. 187-196, 2008.
A.C-C. Yao. How to Generate and Exchange Secrets. FOCS '86, pp. 162-167, 1986.
C. Peikert, B. Waters. Lossy Trapdoor Functions and Their Applications. (41 pp.), 2008.
Gama, Nicolas, et al., "Predicting Lattice Reduction", In Advances in Cryptology—EUROCRYPT '08, vol. 4965 of Lecture Notes in Computer Science, pp. 31-51, 2008.
Gentry, Craig, "Toward Basing Fully Homomorphic Encryption on Worst-Case Hardness", In Advances in Cryptology—CRYPTO '10, vol. 6223 of Lecture Notes in Computer Science, 22 pgs., 2010.
Goldreich, Oded, et al., "Public-Key Cryptosystems from Lattice Reduction Problems", In Advances in Cryptology—CRYPTO '97, vol. 1294 of Lecture notes in Computer Science, pp. 112-131, 1997.
Lyubashevsky, Vadim, et al., On Ideal Lattices and Learning with Errors Over Rings. In Advances in Cryptology—EUROCRYPT '10, vol. 6110 of Lecture Notes in Computer Science, pp. 1-23, 2010.
Micciancio, Daniels, "Improving Lattice Based Cryptosystems Using the Hermite Normal Form", In CaLC '01, vol. 2146 of Lecture Notes in Computer Science, pp. 126-145, 2001.

Peikert, Christ et al., "Lattices that Admit Logarithmic Worst-Case to Average-Case Connection Factors", In Proceedings of the 39th Annual ACM Symposium on Theory of Computing STOC'07, pp. 478-487, Apr. 4, 2007.
Schnorr, C.P., "A Hierarchy of Polynomial Time Lattice Basis Reduction Algorithms", Theor. Comput. Sci., 53.201, pp. 201-224, 1987.
Schoup, NTL: A Library for doing Number Theory, http://shoup.net/ntl/; Version 5.5.2, Nov. 2010.
Smart, Nigel P., et al., "Fully Homomorphic Encryption with Relatively Small Key and Ciphertext Sizes", In Public Key Crypotography-PKC'10, vol. 6056 of Lecture Notes in Computer Science, pp. 420-443, 2010.
Stehle, Damien, et al., "Faster Fully Homomorphic Encryption", Crypotology ePrint Archive, Report 2010/399, http://eprint.iacr.org/; 25 pgs. 2010.
Applebaum, Benny, et al., "Fast Cryptographic Primitives and Circular-Secure Encryption Based on Hard Learning Problems", CRYPTO, vol. 5677 of Lecture Notes in Computer Science, pp. 595-618, 2009.
Brakerski, Zvika, et al., Efficient Fully Homomorphic Encryption from (Standard) LWE, FOCS, http://eprint.iacr.org/; 37 pgs. 2011.
Brakerski, Zvika, et al., "Fully Homomorphic Encryption from Ring-LWE and Security for Key Dependent Messages", CRYPTO, 2011, 20 pgs.
Coron, Jean-Sebastien, et al., "Fully Homomorphic Encryption over the Integers with Shorter Public Keys", CRYPTO, 2011, 24 pgs.
Gentry, Craig et al., "Fully Homomorphic Enryption without Squashing Using Depth-3 Arithmetic Circuits", FOCS, http://eprint.iacr.org/; 2011, 21 pgs.
Gentry, Craig, et al., "Implementing Gentry's Fully-Homomorphic Encryption Scheme", EUROCRYPT, vol. 0632, Lecture notes in Computer Science, 2011, pp. 129-148.
Gentry, Craig, et al., "Fully Homomorphic Encryption with Polylog Overhead", http://eprint.iacr.org/; 2011, 32 pgs.
Lauter, Kristin, et al., "Can Homomorphic Encryption be Practical?", ACM, 2011, 11 pgs.
Melchor, Carlos Aguilar, et al., "Additively Homomorphic Enryption with d-Operand Multiplications", CRYPTOm vik, 6223, Lecture Notes in Computer Science, 2010, pp. 138-154.
Regev, Oded, "The Learning with Errors Problem", IEEE, 2010, pp. 191-204.
Smart, N.P. et al., "Fully Homomorphic SIMD Operations", http://eprint.iacr.org/; 2011, 19 pgs.
Stehle, Damien, et al., "Faster Fully Homomorphic Encryption", ASIACRYPT, vol. 6477, Lecture Notes in Computer Science, 2010, pp. 377-394.
Chunsheng, Gu, "New fully Homomorphic Encryption over the Integers", School of Computer Engineering, Jiangsu Teachers Univ. of Technology, Mar. 2011, 9 pgs.
Dodis, Yevgeniy, et al., "Cryptography Against Continuous Memory Attacks", IEEE 2010, pp. 511-520.
Avanzi, Roberto M., "Fast Evaluation of Polynomials With Small Coefficients Modulo an Integer", http://caccioppoli.mac.rub.de/website/papers/trick.pdf; 2005, 5 pgs.
Gentry, Craig, et al., "Public Challenges for Fully-Homomorphic Encryption", TBA, 2010, 2 pgs.
Micciancio, Daniele "Generalized Compact Knapsacks, Cyclic Lattices, and Efficient One-Way Functions", Computational Complexity 16(4), Dec. 2007, pp. 365-411.
Paterson, Michael S., et al., "On the Number of Nonscalar Multiplications Necessary to Evaluate Polynomials", SIAM Journal on Computing, 2(1), pp. 60-66, 1973.
Granlund, Torbjorn, et al., "The GNU MP Multiple Precision Arithmetic Library", Version 5.0.1, Feb. 2010, 144 pgs.
Dijk et al., http://csis.bits-pilani.ac.in/faculty/murali/netsec-11/seminadrefs/jaldeepl.pdf; [online] published Jun. 2010 [retrieved on Jul. 5, 2012 (Jul. 5, 2012)] Retrieved from the Internet URL: http://csis.bits-pilani.acin/faculty/murali/netsec-11/seminar/refs/jaldeepl.pdf; entire document.
U.S. Appl. No. 13/205,795, Craig B. Gentry, et al., "Fast Computation of a Single Coefficient in an Inverse Polynomial", filed Aug. 9, 2011, 104 pgs.

(56) References Cited

OTHER PUBLICATIONS

U.S. Appl. No. 13/205,813, Craig B. Gentry, et al., "Efficient Implementation of Fully Homomorphic Encryption", filed Aug. 9, 2011, 108 pgs.
Feller, W.; "An Introduction to Probability Theory and Its Applications", vol. 1, 3rd Edition; 1968; whole document (525 pages); John Wiley & Sons, Inc.
Gentry, C.; "Computing arbitrary function of encrypted data"; Communications of the ACM, vol. 53, No. 3; Mar. 2010; pp. 97-105.
Brakerski, Z. et al.; "(Leveled) Fully Homomorphic Encryption without Bootstrapping"; 2012; Proceedings of the 3$^{rd}$ Innovations in Theoretical Computer Science Conference, ITCS '12; ACM, New York, NY, UWA; pp. 309-325.
U.S. Appl. No. 13/205,755; Craig B. Gentry et al.; "Fast Evaluation of Many Polynomials with Small Coefficients on the Same Point"; filed Aug. 9, 2011; 104 pages.
Dijk, et al.; "Fully Homomorphic Encryption Over the Integers"; Jun. 2010; 28 pages.
R. Ostrovsky, W.E. Skeith III. Private Searching on Streaming Data. (Preliminary Version in Proc. of Crypto '05. LNCS 3621, pp. 223-240, 2005.) *J. Cryptology*, vol. 20:4, pp. 397-430, Nov. 2006, Oct. 2007 (two versions provided).
R.L. Rivest, L. Adelman, M.L. Dertouzos. On Data Banks and Privacy Homomorphisms. In Foundations of Secure Computation, pp. 169-180, 1978.
R.L. Rivest, A. Shamir, L. Adelman. A Method for Obtaining Digital Signatures and Public-Key Cryptosystems. In Comm. of the ACM, 21.2, pp. 120-126, 1978.
IBM Researcher Solves Longstanding Cryptographic Challenge. IBM Press Release (available online), Jun. 25, 2009.
Homomorphic Encryption. IBM Research, Security (available online), Accessed Sep. 28, 2009.
M. Naor, K. Nissim. Communication Preserving Protocols for Secure Function Evaluation. In Proc. of STOC '01, pp. 590-599, 2001.

* cited by examiner

301 — RECEIVING A FIRST CIPHERTEXT AND A SECOND CIPHERTEXT, WHERE THE FIRST CIPHERTEXT COMPRISES FIRST DATA ENCRYPTED IN ACCORDANCE WITH AN ENCRYPTION SCHEME AND THE SECOND CIPHERTEXT COMPRISES SECOND DATA ENCRYPTED IN ACCORDANCE WITH THE ENCRYPTION SCHEME, WHERE THE ENCRYPTION SCHEME USES A PUBLIC KEY AND A SECRET KEY AND INCLUDES AN ENCRYPTION FUNCTION, A DECRYPTION FUNCTION, AT LEAST ONE OPERATION FUNCTION AND A REFRESH FUNCTION, WHERE THE ENCRYPTION FUNCTION OPERATES TO OBTAIN CIPHERTEXT BY ENCRYPTING DATA USING THE PUBLIC KEY, WHERE THE DECRYPTION FUNCTION OPERATES USING THE SECRET KEY TO DECRYPT CIPHERTEXT FOR DATA ENCRYPTED USING THE PUBLIC KEY AND OBTAIN THE DATA, WHERE THE AT LEAST ONE OPERATION FUNCTION RECEIVES AT LEAST TWO CIPHERTEXTS AND USES THE PUBLIC KEY TO PERFORM AT LEAST ONE OPERATION ON THE AT LEAST TWO CIPHERTEXTS AND OBTAIN A RESULTING CIPHERTEXT, WHERE THE REFRESH FUNCTION OPERATES TO PREVENT GROWTH OF THE MAGNITUDE OF NOISE FOR A CIPHERTEXT WHILE REDUCING THE MODULUS OF THE CIPHERTEXT WITHOUT USING THE SECRET KEY, WHERE THE REFRESH FUNCTION UTILIZES A MODULUS SWITCHING TECHNIQUE THAT COMPRISES TRANSFORMING A FIRST CIPHERTEXT C MODULO Q INTO A SECOND CIPHERTEXT C' MODULO P WHILE PRESERVING CORRECTNESS, WHERE THE MODULUS SWITCHING TECHNIQUE INCLUDES SCALING BY $P/Q$ AND ROUNDING, WHERE $P < Q$, WHERE THE ENCRYPTION SCHEME ENABLES HOMOMORPHIC OPERATIONS TO BE PERFORMED ON CIPHERTEXTS ENCODED AND OPERATED ON IN ACCORDANCE WITH THE ENCRYPTION SCHEME

302 — PERFORMING AT LEAST ONE OPERATION ON THE FIRST CIPHERTEXT AND THE SECOND CIPHERTEXT, USING THE AT LEAST ONE OPERATION FUNCTION, TO OBTAIN A THIRD CIPHERTEXT

303 — REDUCING A NOISE LEVEL OF THE THIRD CIPHERTEXT BY USING THE REFRESH FUNCTION

FIG. 3

FULLY HOMOMORPHIC ENCRYPTION

CROSS-REFERENCE TO RELATED APPLICATIONS

This patent application is a continuation of U.S. patent Ser. No. 13/458,518, filed on Apr. 27, 2012, the disclosure of which is hereby incorporated by reference in its entirety, which claims priority under 35 U.S.C. §119(e) from Provisional Patent Application No. 61/481,048, filed Apr. 29, 2011, the disclosure of which is also incorporated by reference herein in its entirety.

STATEMENT REGARDING FEDERALLY SPONSORED RESEARCH OR DEVELOPMENT

This invention was made with Government support under contract no. FA8750-11-C-0096 awarded by Defense Advanced Research Projects Agency (DARPA). The Government has certain rights to this invention.

TECHNICAL FIELD

The exemplary embodiments of this invention relate generally to encryption/decryption schemes, algorithms, techniques, methods, computer programs and apparatus and, more specifically, relate to homomorphic encryption schemes, algorithms and apparatus.

BACKGROUND

This section endeavors to supply a context or background for the various exemplary embodiments of the invention as recited in the claims. The content herein may comprise subject matter that could be utilized, but not necessarily matter that has been previously utilized, described or considered. Unless indicated otherwise, the content described herein is not considered prior art, and should not be considered as admitted prior art by inclusion in this section.

Encryption schemes that support operations on encrypted data (aka homomorphic encryption) have a very wide range of applications in cryptography. This concept was introduced by Rivest et al. shortly after the discovery of public key cryptography [21], and many known public-key cryptosystems support either addition or multiplication of encrypted data. However, supporting both at the same time seems harder, and until recently attempts at constructing so-called "fully homomorphic" encryption turned out to be insecure.

BRIEF SUMMARY

In one exemplary embodiment of the invention, a computer-readable storage medium storing program instructions, execution of the program instructions resulting in operations comprising: receiving a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perform at least one operation on the at least two ciphertexts and obtain a resulting ciphertext, where the refresh function operates to prevent growth of the magnitude of noise for a ciphertext while reducing the modulus of the ciphertext without using the secret key, where the refresh function utilizes a modulus switching technique that comprises transforming a first ciphertext c modulo q into a second ciphertext c' modulo p while preserving correctness, where the modulus switching technique includes scaling by p/q and rounding, where p<q, where the encryption scheme enables homomorphic operations to be performed on ciphertexts encoded and operated on in accordance with the encryption scheme; performing at least one operation on the first ciphertext and the second ciphertext, using the at least one operation function, to obtain a third ciphertext; and reducing a noise level of the third ciphertext by using the refresh function.

In another exemplary embodiment of the invention, a method comprising: receiving a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perform at least one operation on the at least two ciphertexts and obtain a resulting ciphertext, where the refresh function operates to prevent growth of the magnitude of noise for a ciphertext while reducing the modulus of the ciphertext without using the secret key, where the refresh function utilizes a modulus switching technique that comprises transforming a first ciphertext c modulo q into a second ciphertext c' modulo p while preserving correctness, where the modulus switching technique includes scaling by p/q and rounding, where p<q, where the encryption scheme enables homomorphic operations to be performed on ciphertexts encoded and operated on in accordance with the encryption scheme; performing at least one operation on the first ciphertext and the second ciphertext, using the at least one operation function, to obtain a third ciphertext; and reducing a noise level of the third ciphertext by using the refresh function.

In a further exemplary embodiment of the invention, an apparatus comprising: at least one processor configured to receive a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perform at least one operation on the at least two ciphertexts and obtain a resulting ciphertext, where the refresh function operates to prevent growth of the magnitude of noise for a ciphertext while reducing the modulus of the ciphertext without using the secret key, where the refresh function utilizes a modulus switching technique that comprises transforming a first ciphertext c modulo q into a second ciphertext c' modulo p while preserving correctness, where the modulus switching technique includes scaling by p/q and rounding, where p<q, where the encryption scheme enables homomorphic operations to be performed on ciphertexts encoded and operated on in accordance with the encryption scheme; and at least one memory configured to store the first ciphertext and the second ciphertext, where the at least one processor is further configured to perform at least one operation on the first ciphertext and the second ciphertext, using the at least one operation function, to obtain a third ciphertext; and to reduce a noise level of the third ciphertext by using the refresh function.

In another exemplary embodiment of the invention, an apparatus comprising: means for receiving a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perform at least one operation on the at least two ciphertexts and obtain a resulting ciphertext, where the refresh function operates to prevent growth of the magnitude of noise for a ciphertext while reducing the modulus of the ciphertext without using the secret key, where the refresh function utilizes a modulus switching technique that comprises transforming a first ciphertext c modulo q into a second ciphertext c' modulo p while preserving correctness, where the modulus switching technique includes scaling by p/q and rounding, where p<q, where the encryption scheme enables homomorphic operations to be performed on ciphertexts encoded and operated on in accordance with the encryption scheme; means for performing at least one operation on the first ciphertext and the second ciphertext, using the at least one operation function, to obtain a third ciphertext; and means for reducing a noise level of the third ciphertext by using the refresh function.

In a further exemplary embodiment of the invention, a computer-readable storage medium storing program instructions, execution of the program instructions resulting in operations comprising: receiving a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perform at least one operation on the at least two ciphertexts and obtain a resulting ciphertext, where the refresh function operates to enable slow growth of the magnitude of noise for a ciphertext while maintaining the modulus of the ciphertext constant without using the secret key, where the encryption scheme enables homomorphic operations to be performed on ciphertexts encoded, and operated on in accordance with the encryption scheme; performing at least one operation on the first ciphertext and the second ciphertext, using the at least one operation function, to obtain a third ciphertext; and reducing a noise level of the third ciphertext by using the refresh function.

BRIEF DESCRIPTION OF THE SEVERAL VIEWS OF THE DRAWINGS

The foregoing and other aspects of embodiments of this invention are made more evident in the following Detailed Description, when read in conjunction with the attached Drawing Figures, wherein:

FIG. 3 depicts a logic flow diagram illustrative of the operation of an exemplary method, and the operation of an exemplary computer program, in accordance with the exemplary embodiments of this invention.

DETAILED DESCRIPTION

1 Introduction 1.1 Fully Homomorphic Encryption

Figure 1:
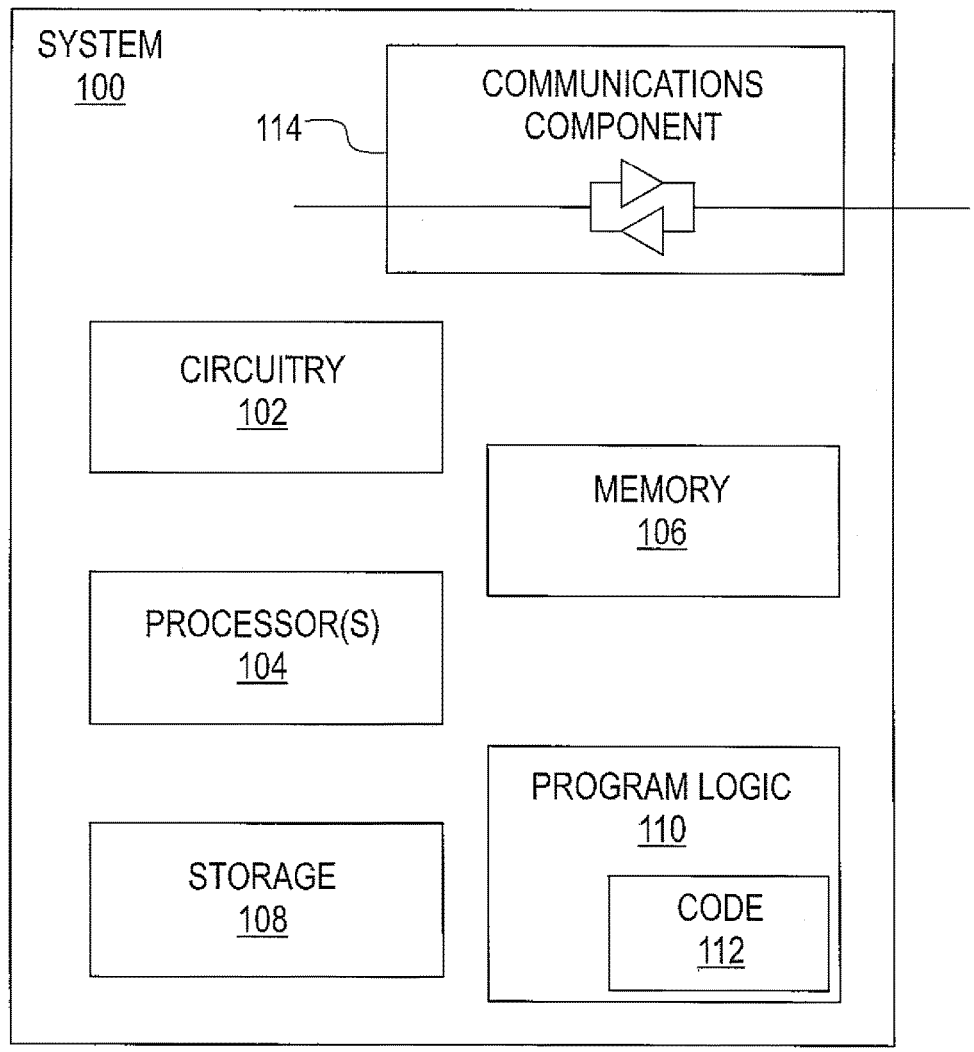
FIG. 1 illustrates a block diagram of an exemplary system in which various exemplary embodiments of the invention may be implemented.

A fully homomorphic encryption scheme may be considered as one that allows the computation of arbitrary functions over encrypted data without requiring the use of a decryption key.

There has existed an open problem of constructing a fully homomorphic encryption scheme. This notion, originally called a privacy homomorphism, was introduced by Rivest, Adleman and Dertouzous (R. Rivest, L. Adleman, and M. Dertouzous. On data banks and privacy homomorphisms. In Foundations of Secure Computation, pages 169-180, 1978) shortly after the development of RSA by Rivest, Shamir, and Adleman (R. Rivest, A. Shamir, and L. Adleman. A method for obtaining digital signatures and public-key cryptosystems. In Comm. of the ACM, 21:2, pages 120-126, 1978). Basic RSA is a multiplicatively homomorphic encryption scheme, i.e., given RSA public key pk=(N,e) and ciphertexts $\{\psi_i \leftarrow \pi_i^e \mod N\}$, one can efficiently compute $\Pi_i \psi_i = (\Pi_i \pi_i)^e \mod N$, a ciphertext that encrypts the product of the original plaintexts. One may assume that it was RSA's multiplicative homomorphism, an accidental but useful property, that led Rivest et al. to ask a natural question: What can one do with an encryption scheme that is fully homomorphic: a scheme $\epsilon$ with an efficient algorithm Evaluate, that, for any valid public key pk, any circuit C (not just a circuit consisting of multiplication gates as in RSA), and any ciphertexts $\psi_i \leftarrow \text{Encrypt}_\epsilon(pk, \pi_i)$, outputs $$\psi \leftarrow \text{Evaluate}_\epsilon(pk, C, \psi_i, \ldots, \psi_t),$$

a valid encryption of $C(\pi_1, \ldots, \pi_t)$ under pk? Their answer: one can arbitrarily compute on encrypted data, i.e., one can process encrypted data (query it, write into it, do anything to it that can be efficiently expressed as a circuit) without the decryption key. As an application, they suggested private data banks. A user can store its data on an untrusted server in encrypted form. Later, the user can send a query on the data to the server, whereupon the server can express this query as a circuit to be applied to the data, and use the Evaluate$_\epsilon$ algorithm to construct an encrypted response to the user's query, which the user then decrypts. One would obviously want the server's response here to be more concise than the trivial solution, in which the server just sends all of the encrypted data back to the user to process on its own.

It is known that one can construct additively homomorphic encryption schemes from lattices or linear codes. The lattice-based scheme and the Reed-Solomon-code-based scheme allow multiplications, though with exponential expansion in ciphertext size. Ciphertexts implicitly contain an "error" that grows as ciphertexts are added together. Thus, ciphertexts output by Evaluate do not have the same distribution as ciphertexts output by Encrypt, and at some point the error may become large enough to cause incorrect decryption. For this reason, the homomorphism is sometimes referred to as a "pseudohomomorphism" or a "bounded homomorphism".

There are schemes that use a singly homomorphic encryption scheme to construct a scheme that can perform more complicated homomorphic operations (T. Sander, A. Young, and M. Yung. Non-interactive cryptocomputing for NC1. In Proc. of FOCS '99, pages 554-567, 1999, and Y. Ishai and A. Paskin. Evaluating Branching Programs on Encrypted Data. In Proc. of TCC '07. Sanders, Young and Yung (SYY) show that one can use a circuit-private additively homomorphic encryption scheme to construct a circuit-private scheme that can handle arbitrary circuits, where the ciphertext size increases exponentially with the depth of the circuit. Their scheme may, therefore, feasibly evaluate NC1 circuits. Ishai and Paskin show how to evaluate branching programs, and with much smaller ciphertexts than SYY. In their scheme Evaluate outputs a ciphertext whose length is proportional to the length of the branching program. This remains true even if the size of the branching program is very large, e.g., super-polynomial. However, the computational complexity of their scheme is proportional to the size.

In more detail, Ishai and Paskin use a "leveled" approach to evaluate a branching program. A (deterministic) branching program (BP) P is defined by a DAG from a distinguished initial node in which each nonterminal node has two outgoing edges labeled 0 and 1, and where the terminal nodes also have labels.

Fully homomorphic encryption (FHE) [21, 8] allows a computationally powerful worker to receive encrypted data and perform arbitrarily-complex dynamically-chosen computations on that data while it remains encrypted, despite not having the secret decryption key. Until recently, all FHE schemes [8, 6, 22, 10, 5, 4] followed the same blueprint, the one laid out in Gentry's original construction[8, 7].

The first step in Gentry's blueprint is to construct a somewhat homomorphic encryption (SWHE) scheme, namely an encryption scheme capable of evaluating "low-degree" polynomials homomorphically. Starting with Gentry's original construction based on ideal lattices [8], there are by now a number of such schemes in the literature [6, 22, 10, 5, 4, 14], all of which are based on lattices (either directly or implicitly). The ciphertexts in all these schemes are "noisy", with a noise that grows slightly during homomorphic addition, and explosively during homomorphic multiplication, and hence, the limitation of low-degree polynomials.

To obtain FHE, Gentry provided a remarkable bootstrapping theorem which states that given a SWHE scheme that can evaluate its own decryption function (plus an additional operation), one can transform it into a "leveled" FHE scheme. (In a "leveled" FHE scheme, the parameters of the scheme may depend on the depth of the circuits that the scheme can evaluate (but not on their size). One can obtain a "pure" FHE scheme (with a constant-size public key) from a leveled FHE scheme by assuming "circular security"—namely, that it is safe to encrypt the leveled FHE secret key under its own public key. We will often omit the term "leveled" in this work.) Bootstrapping "refreshes" a ciphertext by running the decryption function on it homomorphically, using an encrypted secret key (given in the public key or obtainable therefrom), resulting in reduced noise (a reduction of noise generated by the operations).

Until recently, SWHE schemes tended to be incapable of evaluating their own decryption circuits (plus some) without significant modifications. (We discuss recent exceptions [9, 3] below.) Thus, the final step is to squash the decryption circuit of the SWHE scheme, namely transform the scheme into one with the same homomorphic capacity but a decryption circuit that is simple enough to allow bootstrapping. Gentry [8] showed how to do this by adding a "hint"—namely, a large set with a secret sparse subset that sums to the original secret key—to the public key and relying on a "sparse subset sum" assumption.

A bootstrappable encryption scheme is one wherein the encryption scheme can evaluate its own decryption circuit (e.g., slightly augmented versions of its own decryption circuit). Gentry showed that if the decryption circuit of a SWHE scheme is shallow enough, in particular, if it is shallow enough to be evaluated homomorphically by the somewhat homomorphic scheme itself (a self-referential property), then this somewhat homomorphic scheme becomes "bootstrappable", and can be used to construct a fully homomorphic scheme that can evaluate circuits of arbitrary depth.

It may be useful to provide a physical analogy as an aid in visualizing the concept of fully homomorphic encryption. Assume that the owner of a jewelry store wants her employees to assemble raw precious materials (diamonds, gold, etc.) into finished products, but is worried about theft. The owner addresses the problem by constructing glove boxes for which only the owner has the key (analogous to the secret key in an encryption scheme), and puts the raw materials inside the glove boxes (analogous to an encryption operation). Using the gloves, an employee can manipulate the items inside the box. Moreover, an employee can put things inside the box, e.g., a soldering iron to use on the raw materials, although the employee cannot take anything out. Also, the box is transparent, so that an employee can see what he is doing within the box. In this analogy, encryption means that the employee is unable to take something out of the box, not that he is unable to see it. After the employee is finished, the jewelry store owner can recover the finished product at her leisure by using her key. This analogy is inadequate in the sense that the glove box might become quite cluttered, whereas in the fully homomorphic encryption scheme only the final product need remain. In other words, to improve the analogy, imagine that the employee has some way to make any item in the glove box (of his choosing) disappear, even though he still cannot extract the item.

Now imagine that the glove boxes are defective; after an employee uses the gloves for one minute, the gloves stiffen and become unusable (analogous to the accumulation of noise). Unfortunately, even the fastest employee cannot assemble some of the more intricate designs in under a minute. To solve this problem the jewelry store owner gives to an employee that is assembling an intricate design a glove box containing the raw materials, but also several additional glove boxes. Each of these additional glove boxes holds a copy of the master key. To assemble the intricate design, the employee manipulates the materials in box #1 until the gloves stiffen. Then, he places box #1 inside box #2, where the latter box already contains a master key. Using the gloves for box #2, he opens box #1 with the master key, extracts the partially assembled item, and continues the assembly within box #2 until its gloves stiffen. He then places box #2 inside box #3, and so on. The employee finally finishes his assembly inside of box # n. Of course, this procedure assumes that the employee can open box #i within box #(i+1), and have time to some progress on the assembly, all before the gloves of box #(i+1) stiffen. This is analogous to the requirement for a bootstrappable encryption scheme $\epsilon$, that the complexity of $\epsilon$'s (augmented) decryption circuit is less than what $\epsilon$ can homomorphically evaluate.

The foregoing analogy assumes that it is safe to use a single master key that opens all boxes. However, perhaps an employee could use the gloves for box #2, together with master key inside that box, to open the box from the inside, extract the key, and use it to open box #1 and remove the jewels. However, this situation can be avoided by using distinct keys for the boxes, and placing the key for box #1 inside box #2, the key for box #2 inside box #3, and so on. This is analogous to the question of whether the encryption scheme is KDM-secure.

Figure 2:
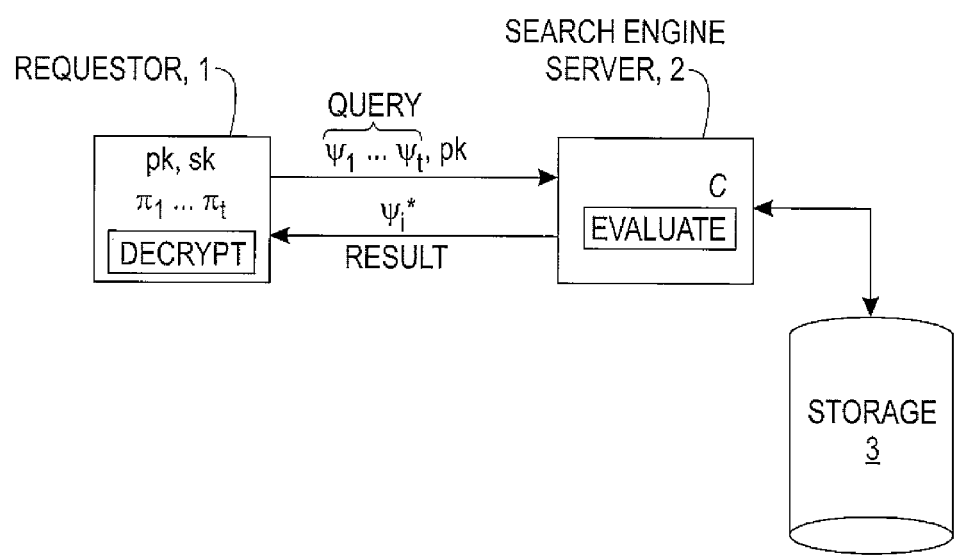
FIG. 2 illustrates a simple block diagram of a requestor and a server (e.g., devices, apparatus, computer programs, systems), such as a search engine, that use the fully homomorphic encryption scheme constructed from a bootstrappable encryption scheme in accordance with the exemplary embodiments of this invention.

One non-limiting application of fully homomorphic encryption is in a two-party setting. A simple example is making encrypted queries to search engines. Referring to FIG. 2, to perform an encrypted search a party (requestor 1) generates a public key pk for the fully homomorphic encryption scheme, and generates ciphertexts $\psi_1, \ldots, \psi_t$ that encrypt the query $\pi_1, \ldots, \pi_t$ under pk. (For example, each $\pi_i$ could be a single bit of the query.) Now, let the circuit C express a search engine server 2 search function for data stored in storage 3. The server 2 sets $\psi_i^* \leftarrow$ Evaluate(pk, $C_i$, $\psi_1, \ldots, \psi_i$), where $C_i$ is the sub-circuit of C that computes the ith bit of the output. Note that, in practice, the evaluation of $C_i^*$ and $C_j^*$ may share intermediate results, in which case it may be needlessly inefficient to run independent instances of the Evaluate algorithm. The server 2 sends these ciphertexts to the requestor 1. It is known that, by the correctness requirement, Decrypt(sk,$\psi_i^*$)=$C_i(\pi_1, \ldots, \pi_t)$. These latter values constitute precisely the answer to the query, which is recoverable through decryption.

As another non-limiting application, the exemplary embodiments of this invention enable searching over encrypted data. In this scenario, assume that the requestor 1 stores files on the server 2 (e.g., on the Internet), so that the requestor 1 can conveniently access these files without needing the requestor's computer. However, the requestor encrypts the files, otherwise the server 2 could potentially read the private data. Let bits $\pi_1, \ldots, \pi_t$ represent the files, which are encrypted in the ciphertexts $\psi_1, \ldots, \psi_t$. Assume then that the requestor 1 later wants to download all encrypted files that satisfy a query, e.g., all files containing the word 'homomorphic' within 5 words of 'encryption', but not the word 'evoting'. The requestor 1 sends the query to the server 2, which expresses it as a circuit C. The server sets $\psi_i^* \leftarrow$ Evaluate(pk, $C_i$, $\psi_1, \ldots, \psi_t$) and sends these ciphertexts to the requestor 1, who decrypts the returned ciphertexts to recover $C(\pi_1, \ldots, \pi_t)$, the (bits of the) files that satisfy the query.

Note that in this application, as in the encrypted search application, the requestor preferably provides an upper bound on the number of bits that the response should have, and the encrypted response from the server 2 is padded or truncated to meet the upper bound.

Fully homomorphic encryption has numerous applications. For example, it enables private search engine queries where the search engine responds to a query without knowledge of the query, i.e., a search engine can provide a succinct encrypted answer to an encrypted (Boolean) query without knowing what the query was. It also enables searching on encrypted data; one can store encrypted data on a remote server and later have the server retrieve only files that (when decrypted) satisfy some Boolean constraint, even though the server cannot decrypt the files on its own. More broadly, fully homomorphic encryption improves the efficiency of secure multiparty computation.

1.2 Efficiency of FHE

The efficiency of fully homomorphic encryption has been a (perhaps, the) big question following its invention. In this paper, we are concerned with the per-gate computation overhead of the FHE scheme, defined as the ratio between the time it takes to compute a circuit homomorphically to the time it takes to compute it in the clear. (Other measures of efficiency, such ciphertext/key size and encryption/decryption time, are also important. In fact, the schemes we present in this paper are very efficient in these aspects (as are the schemes in [9, 3]).) Unfortunately, FHE schemes that follow Gentry's blueprint (some of which have actually been implemented [10, 5]) have fairly poor performance—their per-gate computation overhead is p($\lambda$), a large polynomial in the security parameter. In fact, we would like to argue that this penalty in performance is somewhat inherent for schemes that follow this blueprint.

First, the complexity of (known approaches to) bootstrapping is inherently at least the complexity of decryption times the bit-length of the individual ciphertexts that are used to encrypt the bits of the secret key. The reason is that bootstrapping involves evaluating the decryption circuit homomorphically—that is, in the decryption circuit, each secret-key bit is replaced by a (large) ciphertext that encrypts that bit—and both the complexity of decryption and the ciphertext lengths must each be $\Omega(\lambda)$.

Second, the undesirable properties of known SWHE schemes conspire to ensure that the real cost of bootstrapping for FHE schemes that follow this blueprint is actually much worse than quadratic. Known FHE schemes start with a SWHE scheme that can evaluate polynomials of degree D (multiplicative depth log D) securely only if the underlying lattice problem is hard to $2^D$-approximate. To achieve hardness against $2^\lambda$ time adversaries, the lattice must have dimension $\Omega(D\cdot\lambda)$. This is because we have lattice algorithms in n dimensions that compute $2^{n/\lambda}$-approximations of short vectors in time $2^{\tilde{O}(\lambda)}$. Moreover, the coefficients of the vectors used in the scheme have bit length $\Omega(D)$ to allow the ciphertext noise room to expand to $2^D$. Therefore, the size of "fresh" ciphertexts (e.g., those that encrypt the bits of the secret key) is $\tilde{\Omega}(D^2\cdot\lambda)$. Since the SWHE scheme must be "bootstrappable"—i.e., capable of evaluating its own decryption function—D must exceed the degree of the decryption function. Typically, the degree of the decryption function is $\Omega(\lambda)$. Thus, overall, "fresh" ciphertexts have size $\tilde{\Omega}(\lambda^3)$. So, the real cost of bootstrapping—even if we optimistically assume that the "stale" ciphertext that needs to be refreshed can be decrypted in only $\Theta(\lambda)$-time—is $\tilde{\Omega}(\lambda^4)$.

The analysis above ignores a nice optimization by Stehlé and Steinfeld [24], which so far has not been useful in practice, that uses Chernoff bounds to asymptotically reduce the decryption degree down to $O(\sqrt{\lambda})$. With this optimization, the per-gate computation of FHE schemes that follow the blueprint is $\tilde{\Omega}(\lambda^3)$. (We note that bootstrapping lazily—i.e., applying the refresh procedure only at a 1/L fraction of the circuit levels for L>1—cannot reduce the per-gate computation further by more than a logarithmic factor for schemes that follow this blueprint, since these SWHE schemes can evaluate only log multiplicative depth before it becomes absolutely necessary to refresh—i.e., L=O(log $\lambda$).)

1.3 Recent Deviations from Gentry's Blueprint, and the Hope for Better Efficiency Recently, Gentry and Halevi [9], and Brakerski and Vaikuntanathan[3], independently found very different ways to construct FHE without using the squashing step, and thus without the sparse subset sum assumption. These schemes are the first major deviations from Gentry's blueprint for FHE. Surprisingly, Brakerski and Vaikuntanathan[3] showed how to base security entirely on LWE (for subexponential approximation factors), avoiding reliance on ideal lattices.

From an efficiency perspective, however, these results are not a clear win over previous schemes. Both of the schemes still rely on the problematic aspects of Gentry's blueprint—namely, bootstrapping and an SWHE scheme with the undesirable properties discussed above. Thus, their per-gate computation is still more than $\tilde{\Omega}(\lambda^4)$. Nevertheless, the techniques introduced in these recent constructions are very interesting and useful to us. In particular, we use the tools and techniques introduced by Brakerski and Vaikuntanathan [3] in an essential way to achieve remarkable efficiency gains.

An important, somewhat orthogonal question is the strength of assumptions underlying FHE schemes. All the schemes so far rely on the hardness of short vector problems on lattices with a subexponential approximation factor. Can we base FHE on the hardness of finding a polynomial approximation?

1.4 Our Results and Techniques

We leverage Brakerski and Vaikuntanathan's techniques [3] to achieve asymptotically very efficient FHE schemes. Also, we base security on lattice problems with quasi-polynomial approximation factors. (All previous schemes relied on the hardness of problems with sub-exponential approximation factors.) In particular, we have the following theorem (informal):

Assuming Ring LWE for an approximation factor exponential in L, we have a leveled FHE scheme that can evaluate L-level arithmetic circuits without using bootstrapping. The scheme has $\tilde{\Omega}(\lambda \cdot L^3)$ per-gate computation (namely, quasi-linear in the security parameter).

Alternatively, assuming Ring LWE is hard for quasi-polynomial factors, we have a leveled FHE scheme that uses bootstrapping as an optimization, where the per-gate computation (which includes the bootstrapping procedure) is $\tilde{\Omega}(\lambda^2)$, independent of L.

We can alternatively base security on LWE, albeit with worse performance. We now sketch our main idea for boosting efficiency.

In the BV scheme [3], like ours, a ciphertext vector $c \in R^n$ (where R is a ring, and n is the "dimension" of the vector) that encrypts a message m satisfies the decryption formula $m=[[\langle c,s \rangle]_q]_2$, where $s \in R^n$ is the secret key vector, q is an odd modulus, and $[\cdot]_q$ denotes reduction into the range $(-q/2, q/2)$. This is an abstract scheme that can be instantiated with either LWE or Ring LWE—in the LWE instantiation, R is the ring of integers mod q and n is a large dimension, whereas in the Ring LWE instantiation, R is the ring of polynomials over integers mod q and an irreducible f(x), and the dimension n=2

We will call $[\langle c,s \rangle]_q$ the noise associated to ciphertext c under key s. Decryption succeeds as long as the magnitude of the noise stays smaller than q/2. Homomorphic addition and multiplication increase the noise in the ciphertext. Addition of two ciphertexts with noise at most B results in a ciphertext with noise at most 2B whereas multiplication results in a noise as large as $B^2$. (The noise after multiplication is in fact a bit larger than $B^2$ due to the additional noise from the BV "re-linearization" process. For the purposes of this exposition, it is best to ignore this minor detail.) We will describe a noise-management technique that keeps the noise in check by reducing it after homomorphic operations, without bootstrapping.

The key technical tool we use for noise management is the "modulus switching" technique developed by Brakerski and Vaikuntanathan [3]. Jumping ahead, we note that while they use modulus switching in "one shot" to obtain a small ciphertext (to which they then apply Gentry's bootstrapping procedure), we will use it (iteratively, gradually) to keep the noise level essentially constant, while stingily sacrificing modulus size and gradually sacrificing the remaining homomorphic capacity of the scheme.

1.5 Modulus Switching

The essence of the modulus-switching technique is captured in the following lemma. In words, the lemma says that an evaluator, who does not know the secret key s but instead only knows a bound on its length, can transform a ciphertext c modulo q into a different ciphertext modulo p while preserving correctness—namely, $[\langle c',s \rangle]_p = [\langle c,s \rangle]_q \mod 2$. The transformation from c to c' involves simply scaling by (p/q) and rounding appropriately! Most interestingly, if s is short and p is sufficiently smaller than q, the "noise" in the ciphertext actually decreases—namely, $|[\langle c',s \rangle]_p| < |[\langle c,s \rangle]_q|$.

Lemma 1 Let p and q be two odd moduli, and let c be an integer vector. Define c' to be the integer vector closest to $(p/q) \cdot c$ such that $c' = c \mod 2$. Then, for any s with $|[\langle c,s \rangle]_q| < q/2 - (q/p) \cdot l_1(s)$, we have $$[\langle c',s \rangle]_p = [\langle c,s \rangle]_q \mod 2 \text{ and}$$

$$|[\langle c',s \rangle]_p| < (p/q) \cdot |[\langle c,s \rangle]_q| + l_1(s)$$

where $l_1(s)$ is the $l_1$-norm of s.

Proof. For some integer k, we have $[\langle c,s \rangle]_q = \langle c,s \rangle - kq$. For the same k, let $e_p = \langle c',s \rangle - kp \in Z$. Since $c' = c$ and $p = q$ modulo 2, we have $e_p = [\langle c,s \rangle]_q \mod 2$. Therefore, to prove the lemma, it suffices to prove that $e_p = [\langle c',s \rangle]_p$ and that it has small enough norm. We have $e_p = (p/q)[\langle c,s \rangle]_q + \langle c' - (p/q)c, s \rangle$, and therefore $|e_p| \le (p/q)[\langle c,s \rangle]_q + l_1(s) < p/2$. The latter inequality implies $e_p = [\langle c',s \rangle]_p$.

Amazingly, this trick permits the evaluator to reduce the magnitude of the noise without knowing the secret key, and without bootstrapping. In other words, modulus switching gives us a very powerful and lightweight way to manage the noise in FHE schemes! In [3], the modulus switching technique is bundled into a "dimension reduction" procedure, and we believe it deserves a separate name and close scrutiny. It is also worth noting that our use of modulus switching does not require an "evaluation key", in contrast to [3].

1.6 Our New Noise Management Technique

At first, it may look like modulus switching is not a very effective noise management tool. If p is smaller than q, then of course modulus switching may reduce the magnitude of the noise, but it reduces the modulus size by essentially the same amount. In short, the ratio of the noise to the "noise ceiling" (the modulus size) does not decrease at all. Isn't this ratio what dictates the remaining homomorphic capacity of the scheme, and how can potentially worsening (certainly not improving) this ratio do anything useful?

In fact, it's not just the ratio of the noise to the "noise ceiling" that's important. The absolute magnitude of the noise is also important, especially in multiplications. Suppose that $q \approx x^k$, and that you have two mod-q SWHE ciphertexts with noise of magnitude x. If you multiply them, the noise becomes $x^2$. After 4 levels of multiplication, the noise is $x^{16}$. If you do another multiplication at this point, you reduce the ratio of the noise ceiling (i.e. q) to the noise level by a huge factor of $x^{16}$—i.e., you reduce this gap very fast. Thus, the actual magnitude of the noise impacts how fast this gap is reduced. After only log k levels of multiplication, the noise level reaches the ceiling.

Now, consider the following alternative approach. Choose a ladder of gradually decreasing moduli $\{q_i \approx q/x^i\}$ for i<k. After you multiply the two mod-q ciphertexts, switch the ciphertext to the smaller modulus $q_1 = q/x$. As the lemma above shows, the noise level of the new ciphertext (now with respect to the modulus $q_1$) goes from $x^2$ back down to x. (Let's suppose for now that $l_1$ (s) is small in comparison to x so that we can ignore it.) Now, when we multiply two ciphertexts (wrt modulus $q_1$) that have noise level x, the noise again becomes $x^2$, but then we switch to modulus $q_2$ to reduce the noise back to x. In short, each level of multiplication only reduces the ratio (noise ceiling)/(noise level) by a factor of x (not something like $x^{16}$). With this new approach, we can perform about k (not just log k) levels of multiplication before we reach the noise ceiling. We have just increased (without bootstrapping) the number of multiplicative levels that we can evaluate by an exponential factor!

This exponential improvement is enough to achieve leveled FHE without bootstrapping. For any polynomial L, we can evaluate circuits of depth L. The performance of the scheme degrades with L—e.g., we need to set $q=g_0$ to have bit length proportional to L—but it degrades only polynomially with L.

Our main observation—the key to obtaining FHE without bootstrapping—is so simple that it is easy to miss and bears repeating: We get noise reduction automatically via modulus switching, and by carefully calibrating our ladder of moduli $\{q_i\}$, one modulus for each circuit level, to be decreasing gradually, we can keep the noise level very small and essentially constant from one level to the next while only gradually sacrificing the size of our modulus until the ladder is used up. With this approach, we can efficiently evaluate arbitrary polynomial-size arithmetic circuits without resorting to bootstrapping.

In terms of performance, this scheme trounces previous FHE schemes (at least asymptotically; the concrete performance remains to be seen). Instantiated with ring-LWE, it can evaluate L-level arithmetic circuits with per-gate computation $\tilde{O}(\lambda \cdot L^3)$—i.e.; computation quasi-linear in the security parameter. Since the ratio of the largest modulus (namely, $g \approx x^L$) to the noise (namely, x) is exponential in L, the scheme relies on the hardness of approximating short vectors to within an exponential in L factor.

1.7 Bootstrapping for Better Efficiency and Better Assumptions

In our FHE-without-bootstrapping scheme, the per-gate computation depends polynomially on the number of levels in the circuit that is being evaluated. While this approach is efficient (in the sense of "polynomial time") for polynomial-size circuits, the per-gate computation may become undesirably high for very deep circuits. So, we re-introduce bootstrapping as an optimization that makes the per-gate computation independent of the circuit depth, and that (if one is willing to assume circular security) allows homomorphic operations to be performed indefinitely without needing to specify in advance a bound on the number of circuit levels.

We are aware of the seeming irony of trumpeting "FHE without bootstrapping" and then proposing bootstrapping "as an optimization". But, first, FHE without bootstrapping is exciting theoretically, independent of performance. Second, whether bootstrapping actually improves performance depends crucially on the number of levels in the circuit one is evaluating. For example, for circuits of depth sub-polynomial in the security parameter, it will be more efficient asymptotically to forgo the bootstrapping optimization.

The main idea is that to compute arbitrary polynomial-depth circuits, it is enough to compute the decryption circuit of the scheme homomorphically. Since the decryption circuit has depth $\approx \log \lambda$, the largest modulus we need has only polylog($\lambda$) bits, and therefore we can base security on the hardness of lattice problems with quasi-polynomial factors. Since the decryption circuit has size $\tilde{O}(\lambda)$ for the RLWE-based instantiation, the per-gate computation becomes $\tilde{O}(\lambda^2)$ (independent of L). See Section 5 for details.

1.8 Other Optimizations

We also consider batching as an optimization. The idea behind batching is to pack multiple plaintexts into each ciphertext so that a function can be homomorphically evaluated on multiple inputs with approximately the same efficiency as homomorphically evaluating it on one input.

An especially interesting case is batching the decryption function so that multiple ciphertexts—e.g., all of the ciphertexts associated to gates at some level in the circuit—can be bootstrapped simultaneously very efficiently. For circuits of large width (say, width $\lambda$), batched bootstrapping reduces the per-gate computation in the RLWE-based instantiation to $\tilde{O}(\lambda)$, independent of L. We give the details in Section 5.

1.9 Other Related Work

We note that prior to Gentry's construction, there were already a few interesting homomorphic encryptions schemes that could be called "somewhat homomorphic", including Boneh-Goh-Nissim [2] (evaluates quadratic formulas using bilinear maps), (Aguilar Melchor)-Gaborit-Herranz [16] (evaluates constant degree polynomials using lattices) and Ishai-Paskin [13] (evaluates branching programs).

1.10 Summary

We present a novel approach to fully homomorphic encryption (FHE) that dramatically improves performance and bases security on weaker assumptions. A central conceptual contribution in our work is a new way of constructing leveled fully homomorphic encryption schemes (capable of evaluating arbitrary polynomial-size circuits), without Gentry's bootstrapping procedure.

Specifically, we offer a choice of FHE schemes based on the learning with error (LWE) or ring-LWE (RLWE) problems that have $2^\lambda$ security against known attacks. For RLWE, we have:

A leveled FHE scheme that can evaluate L-level arithmetic circuits with $\tilde{O}(\lambda \cdot L^3)$ per-gate computation—i.e., computation quasi-linear in the security parameter. Security is based on RLWE for an approximation factor exponential in L. This construction does not use the bootstrapping procedure.

A leveled FHE scheme that uses bootstrapping as an optimization, where the per-gate computation (which includes the bootstrapping procedure) is $\tilde{O}(\lambda^2)$, independent of L. Security is based on the hardness of RLWE for quasi-polynomial factors (as opposed to the sub-exponential factors needed in previous schemes).

We obtain similar results to the above for LWE, but with worse performance.

Based on the Ring LWE assumption, we introduce a number of further optimizations to our schemes. As an example, for circuits of large width—e.g., where a constant fraction of levels have width at least $\lambda$—we can reduce the per-gate computation of the bootstrapped version to $\tilde{O}(\lambda)$, independent of L, by batching the bootstrapping operation. Previous FHE schemes all required $\tilde{\Omega}(\lambda^{3.5})$ computation per gate.

At the core of our construction is a much more effective approach for managing the noise level of lattice-based ciphertexts as homomorphic operations are performed, using some new techniques recently introduced by Brakerski and Vaikuntanathan (FOCS 2011).

2 Preliminaries 2.1 Basic Notation

In our construction, we will use a ring R. In our concrete instantiations, we prefer to use either R=Z (the integers) or the polynomial ring $R=Z[x]/(x^d+1)$, where d is a power of 2.

We write elements of R in lowercase—e.g., r∈R. We write vectors in bold—e.g., v∈R$^n$. The notation v[i] refers to the i-th coefficient of v. We write the dot product of u, v∈R$^n$ as $\langle u, v \rangle = \Sigma_{i=1}^n u[i] \cdot v[i] \in R$. When R is a polynomial ring, $\|r\|$ for r∈R refers to the Euclidean norm of r's coefficient vector. We say $\gamma_R = \max\{\|a \cdot b\|/\|a\|\|b\| : a, b \in R\}$ is the expansion factor of R. For $R=Z[x]/(x^d+1)$, the value of $\gamma_R$ is at most $\sqrt{d}$ by Cauchy-Schwarz. (The canonical embedding [15] provides a better, tighter way of handling the geometry of cyclotomic rings. We instead use the expansion factor, defined above, for its simplicity, and since it suffices for our asymptotic results.)

For integer q, we use $R_q$ to denote R/qR. Sometimes we will use abuse notation and use $R_2$ to denote the set of R-elements with binary coefficients—e.g., when R=Z, $R_2$ may denote $\{0,1\}$, and when R is a polynomial ring, $R_2$ may denote those polynomials that have 0/1 coefficients. We use $R_{q,d}$ when we also want to specify the degree of the polynomial associated to R. When it is obvious that q is not a power of two, we will use $\lceil \log q \rceil$ to denote $1 + \lfloor \log q \rfloor$. For a∈R, we use the notation $[a]_q$ to refer to a mod q, with coefficients reduced into the range $(-q/2, q/2]$.

2.2 Leveled Fully Homomorphic Encryption

Most of this application will focus on the construction of a leveled fully homomorphic scheme, in the sense that the parameters of the scheme depend (polynomially) on the depth of the circuits that the scheme is capable of evaluating.

Definition 1 (Leveled FHE [7]) We say that a family of homomorphic encryption schemes $\{E^{(L)} : L \in Z^+\}$ is leveled fully homomorphic if, for all $L \in Z^+$, they all use the same decryption circuit, $E^{(L)}$ compactly evaluates all circuits of depth at most L (that use some specified complete set of gates), and the computational complexity of $E^{(L)}$'s algorithms is polynomial (the same polynomial for all L) in the security parameter, L, and (in the case of the evaluation algorithm) the size of the circuit.

2.3 the Learning with Errors (LWE) Problem

The learning with errors (LWE) problem was introduced by Regev [19]. It is defined as follows.

Definition 2 (LWE) For security parameter $\lambda$, let $n=n(\lambda)$ be an integer dimension, let $q=q(\lambda) \geq 2$ be an integer, and let $\chi = \chi(\lambda)$ be a distribution over Z. The $LWE_{n,q,\chi}$ problem is to distinguish the following two distributions: In the first distribution, one samples $(a_i, b_i)$ uniformly from $Z_q^{n+1}$. In the second distribution, one first draws $s \leftarrow Z_q^n$ uniformly and then samples $(a_i, b_i) \in Z_q^{n+1}$ by sampling $a_i \leftarrow Z_q^n$ uniformly, $e_i \leftarrow \chi$, and setting $b_i = \langle a, s \rangle + e_i$. The $LWE_{n,q,\chi}$ assumption is that the $LWE_{n,q,\chi}$ problem is infeasible.

Regev [19] proved that for certain moduli q and Gaussian error distributions $\chi$, the $LWE_{n,q,\chi}$ assumption is true as long as certain worst-case lattice problems are hard to solve using a quantum algorithm. We state this result using the terminology of B-bounded distributions, which is a distribution over the integers where the magnitude of a sample is bounded with high probability. A definition follows.

Definition 3 (B-Bounded Distributions) A distribution ensemble $\{\chi_n\}_{n \in N}$, supported over the integers, is called B-bounded if $$\Pr_{e \leftarrow \chi_n}[|e| > B] = negl(n).$$

We can now state Regev's worst-case to average-case reduction for LWE.

Theorem 1 (Regev) For any integer dimension n, prime integer $q=q(n)$, and $B=B(n) \geq 2n$, there is an efficiently samplable B-bounded distribution $\chi$ such that if there exists an efficient (possibly quantum) algorithm that solves $LWE_{n,q,\chi}$, then there is an efficient quantum algorithm for solving $\tilde{O}(qn^{1.5}/B)$-approximate worst-case SIVP and gapSVP.

Peikert [18] de-quantized Regev's results to some extent—that is, he showed the $LWE_{n,q,\chi}$ assumption is true as long as certain worst-case lattice problems are hard to solve using a classical algorithm. (See [18] for a precise statement of these results.)

Applebaum et al. [1] showed that if LWE is hard for the above distribution of s, then it is also hard when s's coefficients are sampled according to the noise distribution $\chi$.

2.4 the Ring Learning with Errors (RLWE) Problem

The ring learning with errors (RLWE) problem was introduced by Lyubaskevsky, Peikert and Regev [15]. We will use a simplified special-case version of the problem that is easier to work with [20, 4].

Definition 4 (RLWE) For security parameter $\lambda$, let $f(x) = x^d + 1$ where $d = d(\lambda)$ is a power of 2. Let $q=q(\lambda) \geq 2$ be an integer. Let $R=Z[x]/(f(x))$ and let $R_q = R/qR$. Let $\chi = \chi(\lambda)$ be a distribution over R. The $RLWE_{d,q,\chi}$ problem is to distinguish the following two distributions: In the first distribution, one samples $(a_i, b_i)$ uniformly from $R_q^2$. In the second distribution, one first draws $s \leftarrow R_q$ uniformly and then samples $(a_i, b_i) \in R_q^2$ by sampling $a_i \leftarrow R_q$ uniformly, $e_i \leftarrow \chi$, and setting $b_i = a_i \cdot s + e_i$. The $RLWE_{d,q,\chi}$ assumption is that the $RLWE_{d,q,\chi}$ problem is infeasible.

The RLWE problem is useful, because the well-established shortest vector problem (SVP) over ideal lattices can be reduced to it, specifically:

Theorem 2 (Lyubashevsky-Peikert-Regev [15]) For any d that is a power of 2, ring $R=Z[x]/(x^d+1)$, prime integer $q=q(d)=1 \mod d$, and $B=\omega(\sqrt{d\log d})$, there is an efficiently samplable distribution $\chi$ that outputs elements of R of length at most B with overwhelming probability, such that if there exists an efficient algorithm that solves $RLWE_{d,q,\chi}$, then there is an efficient quantum algorithm for solving $d^{\omega(1)} \cdot (q/B)$–approximate worst-case SVP for ideal lattices over R.

Typically, to use RLWE with a cryptosystem, one chooses the noise distribution $\chi$ according to a Gaussian distribution, where vectors sampled according to this distribution have length only poly(d) with overwhelming probability. This Gaussian distribution may need to be "ellipsoidal" for certain reductions to go through [15]. It has been shown for RLWE that one can equivalently assume that s is alternatively sampled from the noise distribution $\chi$ [15].

2.5 the General Learning with Errors (GLWE) Problem

The learning with errors (LWE) problem and the ring learning with errors (RLWE) problem are syntactically identical, aside from using different rings (Z versus a polynomial ring) and different vector dimensions over those rings (n=poly($\lambda$) for LWE, but n is constant—namely, 1—in the RLWE case). To simplify our presentation, we define a "General Learning with Errors (GLWE)" Problem, and describe a single "GLWE-based" FHE scheme, rather than presenting essentially the same scheme twice, once for each of our two concrete instantiations.

Definition 5 (GLWE) For security parameter $\lambda$, let $n=n(\lambda)$ be an integer dimension, let $f(x)=x^d+1$ where $d=d(\lambda)$ is a power of 2, let $q=q(\lambda) \geq 2$ be a prime integer, let $R=Z[x]/(f(x))$ and $R_q=R/qR$, and let $\chi=\chi(\lambda)$ be a distribution over R. The $GLWE_{n,f,q,\chi}$ problem is to distinguish the following two distributions: In the first distribution, one samples $(a_i, b_i)$ uniformly from $R_q^{n+1}$. In the second distribution, one first draws $s \leftarrow R_q^n$ uniformly and then samples $(a_i, b_i) \in R_q^{n+1}$ by sampling $a_i \leftarrow R_q^n$ uniformly, $e_i \leftarrow \chi$, and setting $b_i = \langle a_i, s \rangle + e_i$. The $GLWE_{n,f,q,\chi}$ assumption is that the $GLWE_{n,f,q,\chi}$ problem is infeasible.

LWE is simply GLWE instantiated with d=1. RLWE is GLWE instantiated with n=1. Interestingly, as far as we know, instances of GLWE between these extremes have not been explored. One would suspect that GLWE is hard for any (n,d) such that $n \cdot d = \Omega(\lambda \log(q/B))$, where B is a bound (with overwhelming probability) on the length of elements output by $\chi$. For fixed $n \cdot d$, perhaps GLWE gradually becomes harder as n increases (if it is true that general lattice problems are harder than ideal lattice problems), whereas increasing d is probably often preferable for efficiency.

If q is much larger than B, the associated GLWE problem is believed to be easier (i.e., there is less security). Previous FHE schemes required q/B to be sub-exponential in n or d to give room for the noise to grow as homomorphic operations (especially multiplication) are performed. In our FHE scheme without bootstrapping, q/B will be exponential in the number of circuit levels to be evaluated. However, since the decryption circuit can be evaluated in logarithmic depth, the bootstrapped version of our scheme will only need q/B to be quasi-polynomial, and we thus base security on lattice problems for quasi-polynomial approximation factors.

By the GLWE assumption, the distribution $\{(a_i, \langle a_i, s \rangle + t \cdot e_i)\}$ is computational indistinguishable from uniform for any t relatively prime to q. This fact will be convenient for encryption, where, for example, a message m may be encrypted as $(a, \langle a, s \rangle + 2e + m)$, and this fact can be used to argue that the second component of this message is indistinguishable from random.

3 (Leveled) FHE without Bootstrapping: Our Construction

The plan of this section is to present our leveled FHE-without-bootstrapping construction in modular steps. First, we describe a plain GLWE-based encryption scheme with no homomorphic operations. Next, we describe variants of the "relinearization" and "dimension reduction" techniques of [3]. Finally, in Section 3.4, we lay out our construction of FHE without bootstrapping.

3.1 Basic Encryption Scheme

We begin by presenting a basic GLWE-based encryption scheme with no homomorphic operations. Let $\lambda$ be the security parameter, representing $2^\lambda$ security against known attacks ($\lambda=100$ is a reasonable value).

Let $R=R(\lambda)$ be a ring. For example, one may use $R=Z$ if one wants a scheme based on (standard) LWE, or one may use $R=Z[x]/f(x)$ where (e.g.) $f(x)=x^d+1$ and $d=d(\lambda)$ is a power of 2 if one wants a scheme based on RLWE. Let the "dimension" $n=n(\lambda)$, an odd modulus $q=q(\lambda)$, and a "noise" distribution $\chi=\chi(\lambda)$ over R be additional parameters of the system. These parameters come from the GLWE assumption. For simplicity, assume for now that the plaintext space is $R_2=R/2R$, though larger plaintext spaces are certainly possible.

We go ahead and stipulate here—even though it only becomes important when we introduce homomorphic operations—that the noise distribution $\chi$ is set to be as small as possible. Specifically, to base security on LWE or GLWE, one must use (typically Gaussian) noise distributions with deviation at least some sub-linear function of d or n, and we will let $\chi$ be a noise distribution that barely satisfies that requirement. To achieve $2^\lambda$ security against known lattice attacks, one must have $n \cdot d = \Omega(\lambda \cdot \log(q/B))$ where B is a bound on the length of the noise. Since n or d depends logarithmically on q, and since the distribution $\chi$ (and hence B) depends sub-linearly on n or d, the distribution $\chi$ (and hence B) depends sub-logarithmically on q. This dependence is weak, and one should think of the noise distribution as being essentially independent of q.

Here is a basic GLWE-based encryption scheme with no homomorphic operations. It uses the plaintext space $R_2$ but it is easy to generalize it to plaintext spaces $R_p$, p>2. It uses an integer parameter $N=n \cdot polylog(q)$ that we will discuss in detail following the description of the scheme.

Basic GLWE-Based Encryption Scheme:

E.Setup($1^\lambda, 1^\mu, b$): Use the bit $b \in \{0,1\}$ to determine whether we are setting parameters for a LWE-based scheme (where d=1) or a RLWE-based scheme (where n=1). Choose a $\mu$-bit modulus q and choose the parameters $d=d(\lambda,\mu,b)$, $n=n(\lambda,\mu,b)$, and $\chi=\chi(\lambda,\mu,b)$ appropriately to ensure that the scheme is based on a GLWE instance that achieves $2^\lambda$ security against known attacks. Let $R=Z[x]/(x^d+1)$ and let params=$(q,d,n,N,\chi)$.

E.SecretKeyGen(params): Sample $s' \leftarrow \chi^n$. Set $sk=s \leftarrow (1, s'[1], \ldots, s'[n]) \in R_q^{n+1}$.

E.PublicKeyGen(pararm,sk): Takes as input a secret key $sk=s=(1,s')$ with $s[0]=1$ and $s' \in R_q^n$ and the params. Generate matrix $A' \leftarrow R_q^{N \times n}$ uniformly and a vector $e \leftarrow \chi^N$ and set $b \leftarrow A's' + 2e$. Set A to be the (n+1)-column matrix consisting of b followed by the n columns of $-A'$. (Observe: $A \cdot s = 2e$.) Set the public key pk=A.

E.Enc(params, pk,m): To encrypt a message $m \in R_2$, set $mf(m, 0, \ldots, 0) \in R_q^{n+1}$, sample $r \leftarrow R_2^N$ and output the ciphertext $c \leftarrow m + A^T r \in R_q^{n+1}$.

E.Dec(params,sk,c): Output $m \leftarrow [[\langle c, s \rangle]_q]_2$.

Correctness is easy to see, and it is straightforward to base security on special cases (depending on the parameters) of the GLWE assumption (and one can find such proofs of special cases in prior work). To sketch the main ideas, first note that if an attacker can distinguish the public key A from a uniformly random matrix over $R_q^{N \times (n+1)}$, then the attacker can be used to solve the GLWE problem (for specific parameters). Therefore, assuming the GLWE problem is hard, an attacker cannot efficiently distinguish. Second, if A was indeed chosen uniformly from $R_q^{N \times (n+1)}$, the encryption procedure generates ciphertexts that are statistically independent from m (by the leftover hash lemma), and therefore the attacker has negligible advantage in guessing m.

For the LWE case, it suffices to take $N > 2n \log q$ [19]. For RLWE, it does not necessarily work just to take $N > 2n \log q = 2 \log q$ due to subtle distributional issues—in particular, the problem is that $R_q$ may have many zero divisors. Miceiancio's regularity lemma [17] assures us that if $A \in R_q^{N \times (n+1)}$ and $r \in R_2^N$ are uniform, then $A^T r$ has negligible statistical distance from uniform when $N = \log(q \cdot \lambda^{\omega(1)})$. Lyubashevsky et al. [15] (full version of the paper) give a stronger result when all of the ring elements in the matrix A are in $R_q^*$ (non-zero-divisors)—namely, the distribution is within $2^{-\Omega}$ (d) of uniform when the ring elements in the r are chosen from a discrete Gaussian distribution of width $dq^{1/N}$. (Using this result would necessitate some changes to the encryption scheme above.)

While we think our description of encryption above is useful in that it highlights the high-level similarity of LWE and RLWE, the distributional issues discussed above make it more desirable, in practice, to use a slightly different approach to encryption in the RLWE setting. In particular, Lyubashevsky et al. [15] streamline public key generation and encryption in the RLWE setting as follows:

E.PublicKeyGen(params,sk): As above, except N=1.

E.Enc(params,pk,m): To encrypt a message $m \in R_2$, set $m \leftarrow (m,0) \in R_q^2$, sample $r \leftarrow \chi$ and $e \leftarrow \chi^2$. Output the ciphertext $c \leftarrow m + 2 \cdot e + A^T \cdot r \in R_q^2$. (That is $c \in R_q^2$ is the sum of m, a small even vector, and r (a small ring element) times the single encryption of zero given in the public key (namely $A^T$).

The security of LPR encryption relies on RLWE: assuming RLWE, if $A^T$ were uniform in $R_q^2$, then the two ring elements $m + a_1 \cdot r + e_1$ and $a_2 \cdot r + e_2$ of the ciphertext generated during encryption are pseudorandom.

Below, sometimes other functions will invoke the function E.PublicKeyan(params,sk,N) with an integer parameter N. In that case, it invokes the first version of E.PublicKeyGen (not the LPR version) with the specified value of N.

3.2 Key Switching (Dimension Reduction)

We start by reminding the reader that in the basic GLWE-based encryption scheme above, the decryption equation for a ciphertext c that encrypts m under key s can be written as $m = [[L_c(s)]_q]_2$ where $L_c(x)$ is a ciphertext-dependent linear equation over the coefficients of x given by $L_c(x) = \langle c, x \rangle$.

Suppose now that we have two ciphertexts $c_1$ and $c_2$, encrypting $m_1$ and $m_2$ respectively under the same secret key s. The way homomorphic multiplication is accomplished in [3] is to consider the quadratic equation $Q_{c_1,c_2}(x) \leftarrow L_{c_1}(x) \cdot L_{c_2}(x)$. Assuming the noises of the initial ciphertexts are small enough, we obtain $m_1 \cdot m_2 = [Q_{c_1,c_2}(s)]_q]_2$, as desired. If one wishes, one can view $Q_{c_1,c_2}(x)$ as a linear equation $L_{c_1,c_2}^{long}(x \otimes x)$ over the coefficients of $x \otimes x$—that is, the tensoring of x with itself—where $x \otimes x$'s dimension is roughly the square of x's. Using this interpretation, the ciphertext represented by the coefficients of the linear equation $L^{long}$ is decryptable by the long secret key $s_1 \otimes s_1$ via the usual dot product. Of course, we cannot continue increasing the dimension like this indefinitely and preserve efficiency.

Thus, Brakerski and Vaikuntanathan convert the long ciphertext represented by the linear equation $L^{long}$ and decryptable by the long tensored secret key $s_1 \otimes s_1$ into a shorter ciphertext $c_2$ that is decryptable by a different secret key $s_2$. (The secret keys need to be different to avoid a "circular security" issue). Encryptions of $s_1 \otimes s_1$ under $s_2$ are provided in the public key as a "hint" to facilitate this conversion.

We observe that Brakerski and Vaikuntanathan's relinearization/dimension reduction procedures are actually quite a bit more general. They can be used to not only reduce the dimension of the ciphertext, but more generally, can be used to transform a ciphertext $c_1$ that is decryptable under one secret key vector $s_1$ to a different ciphertext $c_2$ that encrypts the same message, but is now decryptable under a second secret key vector $s_2$. The vectors $c_2, s_2$ may not necessarily be of lower degree or dimension than $c_1, s_1$.

Below, we review the concrete details of Brakerski and Vaikuntanathan's key switching procedures. The procedures will use some subroutines that, given two vectors c and s, "expand" these vectors to get longer (higher-dimensional) vectors c' and s' such that $\langle c', s' \rangle (=) \langle c, s \rangle \mod q$. We describe these subroutines first.

BitDecomp($x \in R_q^n$, q) decomposes x into its bit representation. Namely, write $x = \sum_{j=0}^{\lfloor \log q \rfloor} 2^j \cdot u_j$ with all $u_j \in R_2^n$. Output $(u_0, u_1, \ldots, u_{\lfloor \log q \rfloor}) \in R_2^{n \cdot \lceil \log q \rceil}$.

Powersof2 $(x \in R_q^n, q)$ outputs $(x, 2 \cdot x, \ldots, 2^{\lfloor \log q \rfloor} \cdot x) \in R_q^{n \cdot \lceil \log q \rceil}$.

If one knows a priori that x has coefficients in [0,B] for B=q, then BitDecomp can be optimized in the obvious way to output a shorter decomposition in $R_2^{n \cdot \lceil \log B \rceil}$. Observe that:

Lemma 2 For vectors c,s of equal length, we have $\langle \text{BitDecomp}(c,q), \text{Powersof2}(s,q) \rangle = \langle c, s \rangle \mod q$.

Proof. Trivial.

We remark that this obviously generalizes to decompositions with respect to bases other than the powers of 2.

Now, key switching consists of two procedures: first, a procedure SwitchKeyGen($s_1, s_2, n_1, n_2, q$), which takes as input the two secret key vectors, the respective dimensions of these vectors, and the modulus q, and outputs some auxiliary information $\tau_{s_1 \leftarrow s_2}$ that enables the switching; and second, a procedure SwitchKey($\tau_{s_1 \leftarrow s_2}, c_1, n_1, n_2, q$), that takes this auxiliary information and a ciphertext encrypted under $s_1$ and outputs a new ciphertext $c_2$ that encrypts the same message under the secret key $s_2$. (Below, we often suppress the additional arguments $n_1, n_2, q$.)

SwitehKeyGen($s_1 \in R_q^{n_1}, s_2 \in R_q^{n_2}$):
1. Run $A \leftarrow$ E.PublicKeyGen($s_2$,N) for $N = n_1 \cdot \lceil \log q \rceil$.
2. Set $B \leftarrow A + \text{Powersof2}(s_1)$ (Add Powersof2($s_1$)$\in R_q^N$ to A's first column.) Output $\tau_{s_1 \leftarrow s_2} = B$.

SwitchKey($\tau_{s_1 \rightarrow s_2}, c_1$): Output $c_2 = \text{BitDecomp}(c_1)^T \cdot B \in R_q^{n_2}$.

Note that, in SwitchKeyGen, the matrix A basically consists of encryptions of 0 under the key $s_2$. Then, pieces of the key $s_1$ are added to these encryptions of 0. Thus, in some sense, the matrix B consists of encryptions of pieces of $s_1$ (in a certain format) under the key $s_2$. We now establish that the key switching procedures are meaningful, in the sense that they preserve the correctness of decryption under the new key.

Lemma 3 [Correctness] Let $s_1, s_2, q, A, B = \tau_{s_1 \rightarrow s_2}$ be as in SwitchKeyGen($s_1, s_2$), and let $A \cdot s_2 = 2e_2 \in R_q^N$. Let $c_1 \in R_q^{n_1}$ and $c_2 \leftarrow$ SwitchKey($\tau_{s_1 \rightarrow s_2}, c_1$). Then, $\langle c_2, s_2 \rangle = 2\langle \text{BitDecomp}(c_1), e_2 \rangle + \langle c_1, s_1 \rangle \mod q$ Proof.

$$\langle c_2, s_2 \rangle = \text{BitDecomp}(c_1)^T \cdot B \cdot s_2$$
$$= \text{BitDecomp}(c_1)^T \cdot (2e_2 + \text{Powersof2}(s_1))$$
$$= 2\langle \text{BitDecomp}(c_1), e_2 \rangle +$$
$$\langle \text{BitDecomp}(c_1), \text{Powersof2}(s_1) \rangle$$
$$= 2\langle \text{BitDecomp}(c_1), e_2 \rangle + \langle c_1, s_1 \rangle$$

Note that the dot product of $\text{BitDecomp}(c_1)$ and $e_2$ is small, since $\text{BitDecomp}(c_1)$ is in $R_2^N$. Overall, we have that $c_2$ is a valid encryption of m under key $s_2$, with noise that is larger by a small additive factor.

Again, the processes above are adapted to the plaintext space $R_2$ but are easy to generalize.

3.3 Modulus Switching

Suppose c is a valid encryption of m under s modulo q (i.e., $m=[[\langle c,s \rangle]_q]_2$), and that s is a short vector. Suppose also that c' is basically a simple scaling of c—in particular, c' is the R-vector closest to $(p/q) \cdot c$ such that $c' = c \mod 2$. Then, it turns out (subject to some qualifications) that c' is a valid encryption of m under s modulo p using the usual decryption equation—that is, $m=[[\langle c',s \rangle]_p]_2$! In other words, we can change the inner modulus in the decryption equation—e.g., to a smaller number—while preserving the correctness of decryption under the same secret key! The essence of this modulus switching idea, a variant of Brakerski and Vaikuntanathan's modulus reduction technique, is formally captured in Lemma 4 below.

Definition 6 (Scale) For integer vector x and integers $q>p>m$, we define $x' \leftarrow \text{Scale}(x,q,p,r)$ to be the R-vector closest to $(p/q) \cdot x$ that satisfies $x' = x \mod r$.

Definition 7 ($l_1^{(R)}$ norm) The (usual) norm $l_1(s)$ over the reals equals $\Sigma_i \|s[i]\|$. We extend this to our ring R as follows: $l_1^{(R)}(s)$ for $s \in R^n$ is defined as $\Sigma_i \|s[i]\|$.

Lemma 4 Let d be the degree of the ring (e.g., d=1 when R=Z). Let $q>p>r$ be positive integers satisfying $q=p=1 \mod r$. Let $c \in R^n$ and $c' \leftarrow \text{Scale}(c,q,p,r)$. Then, for any $s \in R^n$ with $\|[\langle c,s \rangle]_q\| < q/2 - (q/p) \cdot \gamma_R \cdot (r/2) \cdot \sqrt{d} \cdot l_1^{(R)}(s)$, we have $[\langle c',s \rangle]_p = [\langle c,s \rangle]_q \mod r$ and $\|[\langle c',s \rangle]_p\| < (p/q) \cdot \|[\langle c',s \rangle]_q\| + \gamma_R \cdot (r/2) \cdot \sqrt{d} \cdot l_1^{(R)}(s)$ Proof. (Lemma 4) We have $[\langle c,s \rangle]_q = \langle c,s \rangle - kq$ for some $k \in R$. For the same k, let $e_p = \langle c',s \rangle - kp \in R$ Note that $e_p = [\langle c',s \rangle]_p \mod p$. We claim that $\|e_p\|$ is so small that $e_p = [\langle c',s \rangle]_p$. We have:

$$\|e_p\| = \|-kp + \langle (p/q) \cdot c, s \rangle + \langle c' - (p/q) \cdot c, s \rangle\| \le$$
$$\|-kp + \langle (p/q) \cdot c, s \rangle\| + \|\langle c' - (p/q) \cdot c, s \rangle\| \le$$
$$(p/q) \cdot \|[\langle c,s \rangle]_q\| + \gamma_R \cdot \sum_{j=1}^{n} \|c'[j] - (p/q) \cdot c[j]\| \cdot \|s[j]\| \le$$
$$(p/q) \cdot \|[\langle c,s \rangle]_q\| + \gamma_R \cdot (r/2) \cdot \sqrt{d} \cdot l_1^{(R)}(s) < p/2$$

Furthermore, modulo r, we have $[\langle c',s \rangle]_p = e_p = \langle c',s \rangle - kp = \langle c,s \rangle - kq = [\langle c,s \rangle]_q$.

The lemma implies that an evaluator, who does not know the secret key but instead only knows a bound on its length, can potentially transform a ciphertext c that encrypts m under key s for modulus q—i.e., $m=[[\langle c,s \rangle]_q]_r$—into a ciphertext c that encrypts m under the same key s for modulus p—i.e., $m=[[\langle c,s \rangle]_p]_r$. Specifically, the following corollary follows immediately from Lemma 4.

Corollary 1 Let p and q be two odd moduli. Suppose c is an encryption of bit m under key s for modulus q—i.e., $m=[[\langle c,s \rangle]_q]_r$. Moreover, suppose that s is a fairly short key and the "noise" $e_q \leftarrow [\langle c,s \rangle]_q$ has small magnitude—precisely, assume that $\|e_q\| < q/2 - (q/p) \cdot (r/2) \cdot \sqrt{d} \cdot \gamma_R \cdot l_1^{(R)}(s)$. Then $c' \leftarrow \text{Scale}(c, q, p, r)$ is an encryption of of bit m under key s for modulus p—i.e., $m=[[\langle c,s \rangle]_p]_r$. The noise $e_p = [\langle c',s \rangle]_p$ of the new ciphertext has magnitude at most $(p/q) \cdot \|[\langle c,s \rangle]_q\| + \gamma_R \cdot (r/2) \cdot \sqrt{d} \cdot l_1^{(R)}(s)$.

Amazingly, assuming p is smaller than q and s has coefficients that are small in relation to q, this trick permits the evaluator to reduce the magnitude of the noise without knowing the secret key! (Of course, this is also what Gentry's bootstrapping transformation accomplishes, but in a much more complicated way.)

3.4 (Leveled) FHE Based on GLWE without Bootstrapping

We now present our FHE scheme. Given the machinery that we have described in the previous subsections, the scheme itself is remarkably simple.

In our scheme, we will use a parameter L indicating the number of levels of arithmetic circuit that we want our FHE scheme to be capable of evaluating. Note that this is an exponential improvement over prior schemes, that would typically use a parameter d indicating the degree of the polynomials to be evaluated.

(Note: the linear polynomial $L^{long}$, used below, is defined in Section 3.2.)

Our FHE Scheme without Bootstrapping:

FHE.Setup($1^\lambda, 1^L$, b): Takes as input the security parameter, a number of levels L, and a bit b. Use the bit $b \in \{0,1\}$ to determine whether we are setting parameters for a LWE-based scheme (where d=1) or a RLWE-based scheme (where n=1). Let $\mu = \mu(\lambda, L, b) = \theta(\log \lambda + \log L)$ be a parameter that we will specify in detail later. For j=L (input level of circuit) to 0 (output level), run $\text{params}_j \leftarrow \text{E.Setup}(1^\lambda, 1^{(j+1) \cdot \mu}, b)$ to obtain a ladder of parameters, including a ladder of decreasing moduli from $q_L$ ($(L+1) \cdot \mu$ bits) down to $q_0$ ($\mu$ bits). (The ring degree $d_j$, dimension $n_j$, and noise distribution $\chi_j$ do not necessarily need to vary (decrease) with the circuit level. In the procedure below, we allow $n_j$ and $\chi_j$ to vary, but defer the case of decreasing $d_j$.)

FHE.KeyGen($\{\text{params}_j\}$): For j=L down to 0, do the following:

(1) Run $s_j \leftarrow \text{E.SecretKeyGen}(\text{params}_j)$ and $A_j \leftarrow \text{E.PublicKeyGen}(\text{params}_j, s_j)$.

(2) Set $$s_{j'} \leftarrow s_j \otimes s_j \in R_{q_j}^{\binom{n_j+1}{2}}.$$

That is, $s_{j'}$ is a tensoring of $s_j$ with itself whose coefficients are each the product of two coefficients of $s_j$ in $R_{q_j}$.

(3) Run $\tau_{s_{j+1'} \to s_j} \leftarrow \text{SwitchKeyGen}(s_{j+1}', s_j)$. (Omit this step when j=L.)

The secret key sk consists of the $s_j$'s and the public key pk consists of the $A_j$'s and $\tau_{s_{j+1}' \to s_j}$'s.

FRE.Enc(params,pk,m): Take a message in $R_2$. Run E.Enc(params$_L$, $A_L$,m).

FHE.Dec(params,sk,c): Suppose the ciphertext is under key $s_j$. Run E.Dec(params$_j$,$s_j$,c). (The ciphertext could be augmented with an index indicating which level it belongs to.)

FHE.Add(pk,$c_1$,$c_2$): Takes two ciphertexts encrypted under the same $s_j$. (If needed, use FHE.Refresh (below) to make it so.) Set $c_3 \leftarrow c_1 + c_2 \mod q_j$. Interpret $c_3$ as a ciphertext under $s_{j'}$ ($s_{j'}$'s coefficients include all of $s_j$'s since $s_{j'} = s_j \otimes s_j$ and $s_j$'s first coefficient is 1) and output: $c_4 \leftarrow$ FHE.Refresh($c_3$, $\tau_{s_{j'} \to s_{j-1}}$, $q_j$, $q_{j-1}$)

FHE.Mult(pk,$c_1$,$c_2$): Takes two ciphertexts encrypted under the same $s_j$. If needed, use FHE.Refresh (below) to make it so.) First, multiply: the new ciphertext, under the secret key $s_{j'} = s_j \otimes s_j$, is the coefficient vector $c_3$ of the linear equation $L_{c_1,c_2}^{long}(x \otimes x)$. Then, output: $c_4 \leftarrow$ FHE.Refresh($c_3$, $\tau_{s_{j'} \to s_{j-1}}$, $q_j$, $q_{j-1}$)

FHE.Refresh(c,$\tau_{s_{j'} \to s_{j-1}}$,$q_j$,$q_{j-1}$): Takes a ciphertext encrypted under $s_{j'}$, the auxiliary information $\tau_{s_{j'} \to s_{j-1}}$ to facilitate key switching, and the current and next moduli $q_j$ and $q_{j-1}$. Do the following:
(1) Switch Keys: Set $c_1 \leftarrow$ SwitchKey($\tau_{s_{j'} \to s_{j-1}}$,c,$q_j$), a ciphertext under the key $s_{j-1}$ for modulus $q_j$.
(2) Switch Moduli: Set $c_2 \leftarrow$ Scale($c_1$,$q_j$,$q_{j-1}$,2), a ciphertext under the key $s_{j-1}$ for modulus $q_{j-1}$.

Remark 1 We mention the obvious fact that, since addition increases the noise much more slowly than multiplication, one does not necessarily need to refresh after additions, even high fan-in ones.

The key step of our new FHE scheme is the Refresh procedure. If the modulus $q_{j-1}$ is chosen to be smaller than $q_j$ by a sufficient multiplicative factor, then Corollary 1 implies that the noise of the ciphertext output by Refresh is smaller than that of the input ciphertext—that is, the ciphertext will indeed be a "refreshed" encryption of the same value. We elaborate on this analysis in the next section.

One can reasonably argue that this scheme is not "FHE without bootstrapping" since $\tau_{s_{j'} \to s_{j-1}}$ can be viewed as an encrypted secret key, and the SwitchKey step can viewed as a homomorphic evaluation of the decryption function. We prefer not to view the SwitchKey step this way. While there is some high-level resemblance, the low-level details are very different, a difference that becomes tangible in the much better asymptotic performance. To the extent that it performs decryption, SwitchKey does so very efficiently using an efficient (not bit-wise) representation of the secret key that allows this step to be computed in quasi-linear time for the RLWE instantiation, below the quadratic lower bound for bootstrapping. Certainly SwitchKey does not use the usual ponderous approach of representing the decryption function as a boolean circuit to be traversed homomorphically. Another difference is that the SwitchKey step does not actually reduce the noise level (as bootstrapping does); rather, the noise is reduced by the Scale step.

4 Correctness, Setting the Parameters, Performance, and Security

Here, we will show how to set the parameters of the scheme so that the scheme is correct. Mostly, this involves analyzing each of the steps within FHE.Add and FHE.Mult—namely, the addition or multiplication itself, and then the SwitchKey and Scale steps that make up FHE.Refresh—to establish that the output of each step is a decryptable ciphertext with bounded noise. This analysis will lead to concrete suggestions for how to set the ladder of moduli and to asymptotic bounds on the performance of the scheme.

Let us begin by considering how much noise FHE.Enc introduces initially. Throughout, $B_\chi$ denotes a bound such that R-elements sampled from the the noise distribution $\chi$ have length at most $B_\chi$ with overwhelming probability.

4.1 The Initial Noise from FHE.Enc

Recall that FHE.Enc simply invokes E.Enc for suitable parameters (params$_L$) that depend on $\lambda$ and L. In turn, the noise of ciphertexts output by E.Enc depends on the noise of the initial "ciphertext(s)" (the encryption(s) of 0) implicit in the matrix A output by E.PublicKeyGen, whose noise distribution is dictated by the distribution $\chi$.

Lemma 5 Let q, d, n, N be the parameters associated to FHE.Enc. Let $\gamma_R$ be the expansion factor associated to R. ($\gamma_R$ and d are both 1 in the LWE case R=7.) The length of the noise in ciphertexts output by FHE.Enc is at most $\sqrt{d} + 2 \cdot \gamma_R \cdot \sqrt{d} \cdot N \cdot B_\chi$.

Proof. We have $A \cdot s = 2e$ where $s \leftarrow$ E.SecretKeyGen, $A \leftarrow$ E.PublicKeyGen(s,N), and $e \leftarrow \chi^N$. Recall that encryption works as follows: $c \leftarrow m + A^T r \mod q$ where $r \in R_2^N$. We have that the noise of this ciphertext is $[\langle c,s \rangle]_q = [m + 2\langle r,e \rangle]_q$. The magnitude of this element is at most $\sqrt{d} + 2 \cdot \gamma_R \cdot \sum_{j=1}^{N} \|r[j]\| \cdot \|e[j]\| \leq \sqrt{d} + 2 \cdot \gamma_R \cdot \sqrt{d} \cdot N \cdot B_\chi$.

One can easily obtain a similar small bound on the noise of ciphertexts output by LPR encryption in the RLWE setting: a small polynomial in the security parameter $\lambda$, L, and log q.

The correctness of decryption for ciphertexts output by FHE.Enc, assuming the noise bound above is less than q/2, follows directly from the correctness of the basic encryption and decryption algorithms E.Enc and E.Dec 4.2 Correctness and Performance of FHE.Add and FHE.Mult (Before FHERefresh)

Consider FHE.Mult. One begins FHE.Mult(pk,$c_1$,$c_2$) with two ciphertexts under key $s_j$ for modulus $q_j$ that have noises $e_i = [L_{c_i}(s_j)]_{q_j}$, where $L_{c_i}(x)$ is simply the dot product $\langle c_i, x \rangle$. To multiply together two ciphertexts, one multiplies together these two linear equations to obtain a quadratic equation $Q_{c_1,c_2}(x) \leftarrow L_{c_1}(x) \cdot L_{c_2}(x)$, and then interprets this quadratic equation as a linear equation $L_{c_1,c_2}^{long}(x \otimes x) = Q_{c_1,c_2}(x)$ over the tensored vector $x \otimes x$. The coefficients of this long linear equation compose the new ciphertext vector $c_3$. Clearly, $[\langle c_3, s_j \otimes s_j \rangle]_{q_j} = [L_{c_1,c_2}^{long}(s_j \otimes s_j)]_{q_j} = [e_1 \cdot e_2]_{q_j}$. Thus, if the noises of $c_1$ and $c_2$ have length at most B, then the noise of $c_3$ has length at most $\gamma_R \cdot B^2$, where $\gamma_R$ is the expansion factor of R. If this length is less than $q_j/2$, then decryption works correctly. In particular, if $m_i = [\langle c_i, s_j \rangle]_{q_j}]_2 = [e_i]_2$ for $i \in \{1,2\}$, then over $R_2$ we have $[\langle c_3, s_j \otimes s_j \rangle]_{q_j}]_2 = [[e_1 \cdot e_2]_{q_j}]_2 = [e_1 \cdot e_2]_2 \cdot [e_2]_2 = m_1 \cdot m_2$. That is, correctness is preserved as long as this noise does not wrap modulo $q_j$.

The correctness of FHE.Add and FHE.Mult, before the FHE.Refresh step is performed, is formally captured in the following lemmas.

Lemma 6 Let $c_1$ and $c_2$ be two ciphertexts under key $s_j$ for modulus $q_j$, where $\|[\langle c_i, s_j \rangle]_{q_j}\| \leq B$ and $m_i = [[\langle c_i, s_j \rangle]_{q_j}]_2$. Let $s_{j'} = s_j \otimes s_j$, where the "non-quadratic coefficients" of $s_{j'}$ (namely, the '1' and the coefficients of $s_j$) are placed first. Let $c' = c_1 + c_2$, and pad c' with zeros to get a vector $c_3$ such that $\langle c_3, s_{j'} \rangle = \langle c', s_j \rangle$. The noise $[\langle c_3, s_{j'} \rangle]_{q_j}$ has length at most 2B. If $2B < q_j/2$, $c_3$ is an encryption of $m_1 + m_2$ under key $s_{j'}$ for modulus $q_j$—i.e., $m_1 \cdot m_2 = [[\langle c_3, s_{j'} \rangle]_{q_j}]_2$.

Lemma 7 Let $c_1$ and $c_2$ be two ciphertexts under key $s_j$ for modulus $q_j$, where $\|[\langle c_i, s_j \rangle]_{q_j}\| \leq B$ and $m_i = [[\langle c_i, s_j \rangle]_{q_j}]_2$. Let the linear equation $L_{c_1,c_2}^{long}(x \otimes x)$ be as defined above, and let $c_3$ be the coefficient vector of this linear equation, and let $s_{j'} = s_j \otimes s_j$. The noise $[\langle c_3, s_{j'} \rangle]_{q_j}$ has length at most $\gamma_R \cdot B^2$. If $\gamma_R \cdot B^2 < q_j/2$, $c_3$ is an encryption of $m_1 \cdot m_2$ under key $s_{j'}$ for for modulus $q_j$—i.e., $m_1 \cdot m_2 = [[\langle c_3, s_{j'} \rangle]_{q_j}]_2$.

The computation needed to compute the tensored ciphertext $c_3$ is $\tilde{O}(d_j n_j^2 \log q_j)$. For the RLWE instantiation, since $n_j = 1$ and since (as we will see) $d_1$ (resp. $\log q_j$) depend only quasi-linearly (resp. logarithmically) on the security parameter and linearly (resp. linearly) on L, the computation here is only quasi-linear in the security parameter. For the LWE instantiation, the computation is quasi-quadratic.

4.3 Correctness and Performance of FHE.Refresh

FHE.Refresh consists of two steps: Switch Keys and Switch Moduli. We address each of these steps in turn.

Correctness and Performance of the Switch-Key Step. In the Switch Keys step, we take as input a ciphertext c under key $s_{j'}$ for modulus $q_j$ and set $c_1 \leftarrow \text{SwitchKey}(\tau_{s_{j'} \to s_{j-1}}, c, q_j)$, a ciphertext under the key $s_{j-1}$ for modulus $q_j$. In Lemma 3, we proved the correctness of key switching and showed that the noise grows by the additive factor $2\langle \text{BitDecomp}(c, q_j), e \rangle$, where $\text{BitDecomp}(c, q_j)$ is a (short) bit-vector and e is a (short and fresh) noise vector with elements sampled from $\chi$. In particular, if the noise originally had length B, then after the Switch Keys step it has length at most $B + 2 \cdot \gamma_R \cdot B_\chi \cdot \Sigma_{i=1}^{w_j} \|\text{BitDecomp}(c, q_j)[i]\| \geq B + 2 \cdot \gamma_R \cdot B_\chi \cdot w_j \cdot \sqrt{d_j}$, where $$w_j \leq \binom{n_j + 1}{2} \cdot \lceil \log q_j \rceil$$

is the dimension of $\text{BitDecomp}(c, q_j)$.

We capture the correctness of the Switch-Key step in the following lemma.

Lemma 8 Let c be a ciphertext under the key $s_{j'} = s_j \otimes s_j$ for modulus $q_j$ such that $e_1 \leftarrow [\langle c, s_{j'} \rangle]_{q_j}$ has length at most B and $m = [e_1]_2$. Let $c_1 \leftarrow \text{SwitchKey}(\tau_{s_{j'} \to s_{j-1}}, c, q_j)$, and let $e_2 = [\langle c_1, s_{j-1} \rangle]_{q_j}$. Then, (the new noise) has length at most $B + 2 \cdot \gamma_R \cdot B_\chi \cdot n_j + 1 \cdot \lceil \log q_j \rceil \cdot \sqrt{d_j}$, and (assuming this noise length is less than $q_j/2$) we have $m = [e_2]_2$.

The Switch-Key step involves multiplying the transpose of $w_j$-dimensional vector $\text{BitDecomp}(c, q_j)$ with a $w_j \times (n_j + 1)$ matrix B. This computation is $\tilde{O}(d_j n_j^3 \log^2 q_j)$. Still this is quasi-linear in the RLWE instantiation.

Correctness and Performance of the Switch-Moduli Step. The Switch Moduli step takes as input a ciphertext $c_1$ under the secret bit-vector $s_{j-1}$ for the modulus $q_j$, and outputs the ciphertext $c_2 \leftarrow \text{Scale}(c_1, q_j, q_{j-1}, 2)$, which we claim to be a ciphertext under key $s_{j-1}$ for modulus $q_{j-1}$. Note that $s_{j-1}$ is a short secret key. By Corollary 1, and using the fact that $l_1(s_{j-1}) \leq (n_{j-1} + 1) \cdot B_\chi$, the following is true: if the noise of $c_1$ has length at most $B < q_j/2 - (q_j/q_{j-1}) \cdot \sqrt{d_j} \cdot \gamma_R \cdot (n_{j-1} + 1) \cdot B_\chi$, then correctness is preserved and the noise of $c_2$ is bounded by $(q_{j-1}/q_j) \cdot B + \sqrt{d_j} \cdot \gamma_R \cdot (n_{j-1} + 1) \cdot B_\chi$. Of course, the key feature of this step for our purposes is that switching moduli may reduce the length of the moduli when $q_{j-1} < q_j$.

We capture the correctness of the Switch-Moduli step in the following lemma.

Lemma 9 Let $c_1$ be a ciphertext under the key $s_{j-1}$, sampled from $\chi^{n_{j-1}}$, such that $e_j \leftarrow [\langle c_1, s_{j-1} \rangle]_{q_j}$ has length at most B and $m = [e_j]_2$. Let $c_2 \leftarrow \text{Scale}(c_1, q_j, q_{j-1}, 2)$, and let $e_{j-1} = [\langle c_2, s_{j-1} \rangle]_{q_{j-1}}$. Then, $e_{j-1}$ (the new noise) has length at most $(q_{j-1}/q_j) \cdot B + \sqrt{d_j} \cdot \gamma_R \cdot (n_{j-1} + 1) \cdot B_\chi$, and (assuming this noise length is less than $q_{j-1}/2$) we have $m = [e_{j-1}]_2$.

The computation in the Switch-Moduli step is $\tilde{O}(d_j n_{j-1} \log q_j)$.

4.4 Putting the Pieces Together: Parameters, Correctness, Performance

So far we have established that the scheme is correct, assuming that the noise does not wrap modulo $q_j$ or $q_{j-1}$. Now we need to show that we can set the parameters of the scheme to ensure that such wrapping never occurs.

Our strategy for setting the parameters is to pick a "universal" bound B on the noise length, and then prove, for all j, that a valid ciphertext under key $s_j$ for modulus $q_j$ has noise length at most B. This bound B is quite small: polynomial in $\lambda$ and $\log q_L$, where $q_L$ is the largest modulus in our ladder. It is clear that such a bound B holds for fresh ciphertexts output by FHE.Enc. (Recall the discussion from Section 3.1 where we explained that we use a noise distribution $\chi$ that is essentially independent of the modulus.) The remainder of the proof is by induction—i.e., we will show that if the bound holds for two ciphertexts $c_1$, $c_2$ at level j, our lemmas above imply that the bound also holds for the ciphertext $c' \leftarrow \text{FHE.Mult}(pk, c_1, c_2)$ at level j−1. (FHE.Mult increases the noise strictly more in the worst-case than FHE.Add for any reasonable choice of parameters.)

Specifically, after the first step of FHE.Mult (without the Refresh step), the noise has length at most $\gamma_R \cdot B^2$. Then, we apply the SwitchKey function, which introduces an additive term $\eta_{SwitchKey,j}$. Finally, we apply the Scale function. The noise is now at most $$(q_{j-1}/q_j) \cdot (\gamma_R \cdot B^2 + \eta_{SwitchKey,j}) + \eta_{Scale,j}$$

where $\eta_{Scale,j}$ is another additive term. Now we want to choose our parameters so that this bound is at most B.

Suppose we set our ladder of moduli and the bound B such that the following two properties hold:
  Property 1: $B \geq 2 \cdot (\eta_{Scale,j} + \eta_{SwitchKey,k})$ for all j.
  Property 2: $q_j/q_{j-1} \geq 2 \cdot B \cdot \gamma_R$ for all j.
Then we have $$(q_{j-1}/q_j) \cdot (\gamma_R \cdot B^2 + \eta_{SwitchKey,j}) + \eta_{Scale,j} <$$
$$(q_{j-1}/q_j) \cdot \gamma_R \cdot B^2 + \eta_{Scale,j} + \eta_{SwitchKey,j} \leq \frac{1}{2 \cdot B \cdot \gamma_R} \cdot \gamma_R \cdot B^2 + \frac{1}{2} \cdot B \leq B$$

It only remains to set our ladder of moduli and B so that Properties 1 and 2 hold.

Unfortunately, there is some circularity in Properties 1 and 2: $q_L$ depends on B which depends on $q_L$, albeit only polylogarithmically. However, it is easy to see that this circularity is not fatal. As a non-optimized example to illustrate this, set $B = \lambda^a \cdot L^b$ for very large constants a and b, and set $q_j \approx 2^{(j+1) \cdot \omega(\log \lambda + \log L)}$. If a and b are large enough, B dominates $\eta_{Scale,L} + \eta_{SwitchKey,L}$, which is polynomial in $\lambda$ and $\log q_L$, and hence polynomial in $\lambda$ and L (Property 1 is satisfied). Since $q_j/q_{j-1}$ is super-polynomial in both $\lambda$ and L, it dominates $2 \cdot B \cdot \gamma_R$ (Property 2 is satisfied). In fact, it works fine to set $q_j$ as a modulus having $(j+1) \cdot \mu$ bits for some $\mu = \theta(\log \lambda + \log L)$ with small hidden constant.

Overall, we have that $q_L$, the largest modulus used in the system, is $\theta(L \cdot (\log \lambda + \log L))$ bits, and $d_L \cdot n_L$ must be approximately that number times $\lambda$ for $2^\lambda$ security.

Theorem 3 For some $\mu = \theta(\log \lambda + \log L)$, FHE is a correct L-leveled FHE scheme—specifically, it correctly evaluates circuits of depth L with Add and Mult gates over $R_2$. The per-gate computation is $\tilde{O}(d_L \cdot n_L^3 \cdot \log^2 q_L) = \tilde{O}(d_L \cdot n_L^3 \cdot L^2)$. For the LWE case (where d=1), the per-gate computation is $\tilde{O}(\lambda^3 \cdot L^5)$. For the RLWE case (where n=1), the per-gate computation is $\tilde{O}(\lambda \cdot L^3)$.

The bottom line is that we have a RLWE-based leveled FHE scheme with per-gate computation that is only quasi-linear in the security parameter, albeit with somewhat high dependence on the number of levels in the circuit.

Let us pause at this point to reconsider the performance of previous FHE schemes in comparison to our new scheme. Specifically, as we discussed in the Introduction, in previous SWHE schemes, the ciphertext size is at least $\tilde{O}(\lambda \cdot d^2)$, where d is the degree of the circuit being evaluated. One may view our new scheme as a very powerful SWHE scheme in which this dependence on degree has been replaced with a similar dependence on depth. (Recall the degree of a circuit may be exponential in its depth.) Since polynomial-size circuits have polynomial depth, which is certainly not true of degree, our scheme can efficiently evaluate arbitrary circuits without resorting to bootstrapping.

4.5 Security

The security of FHE follows by a standard hybrid argument from the security of E, the basic scheme described in Section 3.1. We omit the details.

5 Optimizations

Despite the fact that our new FHE scheme has per-gate computation only quasi-linear in the security parameter, we present several significant ways of optimizing it. We focus primarily on the RLWE-based scheme, since it is much more efficient.

Our first optimization is batching. Batching allows us to reduce the per-gate computation from quasi-linear in the security parameter to polylogarithmic. In more detail, we show that evaluating a function $f$ homomorphically in parallel on $l=\Omega(\lambda)$ blocks of encrypted data requires only polylogarithmically (in terms of the security parameter $\lambda$) more computation than evaluating $f$ on the unencrypted data. (The overhead is still polynomial in the depth L of the circuit computing $f$.) Batching works essentially by packing multiple plaintexts into each ciphertext.

Next, we reintroduce bootstrapping as an optimization rather than a necessity (Section 5.2). Bootstrapping allows us to achieve per-gate computation quasi-quadratic in the security parameter, independent of the number levels in the circuit being evaluated.

In Section 5.3, we show that batching the bootstrapping function is a powerful combination. With this optimization, circuits whose levels mostly have width at least $\lambda$ can be evaluated homomorphically with only $\tilde{O}(\lambda)$ per-gate computation, independent of the number of levels.

Finally, Section 5.5 presents a few other miscellaneous optimizations.

5.1 Batching

Suppose we want to evaluate the same function $f$ on $l$ blocks of encrypted data. (Or, similarly, suppose we want to evaluate the same encrypted function $f$ on $l$ blocks of plaintext data.) Can we do this using less than $l$ times the computation needed to evaluate $f$ on one block of data? Can we batch?

For example, consider a keyword search function that returns '1' if the keyword is present in the data and '0' if it is not. The keyword search function is mostly composed of a large number of equality tests that compare the target word w to all of the different subsequences of data; this is followed up by an OR of the equality test results. All of these equality tests involve running the same w-dependent function on different blocks of data. If we could batch these equality tests, it could significantly reduce the computation needed to perform keyword search homomorphically.

If we use bootstrapping as an optimization (see Section 5.2), then obviously we will be running the decryption function homomorphically on multiple blocks of data—namely, the multiple ciphertexts that need to be refreshed. Can we batch the bootstrapping function? If we could, then we might be able to drastically reduce the average per-gate cost of bootstrapping.

Smart and Vercauteren [23] were the first to rigorously analyze batching in the context of FHE. In particular, they observed that ideal-lattice-based (and RLWE-based) ciphertexts can have many plaintext slots, associated to the factorization of the plaintext space into algebraic ideals.

When we apply batching to our new RLWE-based FHE scheme, the results are pretty amazing. Evaluating $f$ homomorphically on $l=\Omega(\lambda)$ blocks of encrypted data requires only polylogarithmically (in terms of the security parameter $\lambda$) more computation than evaluating $f$ on the unencrypted data. (The overhead is still polynomial in the depth L of the circuit computing $f$.) As we will see later, for circuits whose levels mostly have width at least $\lambda$, batching the bootstrapping function (i.e., batching homomorphic evaluation of the decryption function) allows us to reduce the per-gate computation of our bootstrapped scheme from $\tilde{O}(\lambda^2)$ to $\tilde{O}(\lambda)$ (independent of L).

To make the exposition a bit simpler, in our RLWE-based instantiation where $R=Z[x]/(x^d+1)$, we will not use $R_2$ as our plaintext space, but instead use a plaintext space $R_p$, prime p=1 mod 2d, where we have the isomorphism $R_p \cong R_{p_1} \times \ldots \times R_{p_d}$ of many plaintext spaces (think Chinese remaindering), so that evaluating a function once over $R_p$ implicitly evaluates the function many times in parallel over the respective smaller plaintext spaces. The $p_i$'s will be ideals in our ring $R=Z[x]/(x^d+1)$. (One could still use $R_2$ as in [23], but the number theory there is a bit more involved.)

5.1.1 Some Number Theory

Let us take a very brief tour of algebraic number theory. Suppose p is a prime number satisfying p=1 mod 2d, and let a be a primitive 2d-th root of unity modulo p. Then, $x^d+1$ factors completely into linear polynomials modulo p—in particular, $x^d+1 = \prod_{i=1}^{d}(x-a_i) \bmod p$ where $a_i = a^{2i-1} \bmod p$. In some sense, the converse of the above statement is also true, and this is the essence of reciprocity—namely, in the ring $R=Z[x]/(x^d+1)$ the prime integer p is not actually prime, but rather it splits completely into prime ideals in R—i.e., $p = \prod_{i=1}^{d} p_i$. The ideal $p_i$ equals $(p, x-a_i)$—namely, the set of all R-elements that can be expressed as $r_1 \cdot p + r_2 \cdot (x-a_i)$ for some $r_1, r_2 \in R$. Each ideal $p_i$ has norm p—that is, roughly speaking, a 1/p fraction of R-elements are in $p_i$, or, more formally, the p cosets $0+p_i, \ldots, (p-1)+p_i$ partition R. These ideals are relative prime, and so they behave like relative prime integers. In particular, the Chinese Remainder Theorem applies: $R_p \cong R_{p_1} \times \ldots \times R_{p_d}$.

Although the prime ideals $\{p_i\}$ are relatively prime, they are close siblings, and it is easy, in some sense, to switch from one to another. One fact that we will use (when we finally apply batching to bootstrapping) is that, for any i, j there is an automorphism $\sigma_{i \to j}$ over R that maps elements of $p_i$ to elements of $p_j$. Specifically, $\sigma_{i \to j}$ works by mapping an R-element $r=r(x)=r_{d-1}x^{d-1}+\ldots+r_1x+r_0$ to $$r(x^{e_{ij}}) = r_{d-1}x^{e_{ij}(d-1) \bmod 2d} + \cdots + r_1 x^{e_{ij}} + r_0$$

where $e_{ij}$ is some odd number in $[1, 2d]$. Notice that this automorphism just permutes the coefficients of r and fixes the free coefficient. Notationally, we will use $\sigma_{i \to j}(v)$ to refer to the vector that results from applying $\sigma_{i \to j}$ coefficient-wise to v.

5.1.2 How Batching Works

Deploying batching inside our scheme FHE is quite straightforward. First, we pick a prime $p=1 \mod 2d$ of size polynomial in the security parameter. (One should exist under the GRH.)

The next step is simply to recognize that our scheme FHE works just fine when we replace the original plaintext space $R_2$ with $R_p$. There is nothing especially magical about the number 2. In the basic scheme E described in Section 3.1, E.PublicKeyGen(params,sk) is modified in the obvious way so that $A \cdot s = p \cdot e$ rather than $2 \cdot e$. (This modification induces a similar modification in SwitchKeyGen.) Decryption becomes $m=[[\langle c,s \rangle]_q]_p$. Homomorphic operations use mod-p gates rather than boolean gates, and it is easy (if desired) to emulate boolean gates with mod-p gates—e.g., we can compute XOR (a,b) for $a,b \in \{0,1\}^2$ using mod-p gates for any p as $a+b-2ab$. For modulus switching, we use $\text{Scale}(c_1,q_j,q_{j-1},p)$ rather than $\text{Scale}(c_1,q_j,q_{j-1},2)$. The larger rounding error from this new scaling procedure increases the noise slightly, but this additive noise is still polynomial in the security parameter and the number of levels, and thus is still consistent with our setting of parameters. In short, FHE can easily be adapted to work with a plaintext space $R_p$ for p of polynomial size.

The final step is simply to recognize that, by the Chinese Remainder Theorem, evaluating an arithmetic circuit over $R_p$ on input $x \in R_p^n$ implicitly evaluates, for each i, the same arithmetic circuit over $R_{p_i}$ on input x projected down to $R_{p_i}^n$. The evaluations modulo the various prime ideals do not "mix" or interact with each other.

Theorem 4 Let $p=1 \mod 2d$ be a prime of size polynomial in $\lambda$. The RLWE—based instantiation of FHE using the ring $R=Z[x]/(x^d+1)$ can be adapted to use the plaintext space $R_p = \bigotimes_{i=1}^{d} R_{p_i}$ while preserving correctness and the same asymptotic performance. For any boolean circuit $f$ of depth L, the scheme can homomorphically evaluate $f$ on l sets of inputs with per-gate computation $\tilde{O}(\lambda \cdot L^3 / \min. \{d,l\})$.

When $l \geq \lambda$, the per-gate computation is only polylogarithmic in the security parameter (still cubic in L).

5.2 Bootstrapping as an Optimization

Bootstrapping is no longer strictly necessary to achieve leveled FHE. However, in some settings, it may have some advantages:

Performance: The per-gate computation is independent of the depth of the circuit being evaluated.

Flexibility: Assuming circular security, a bootstrapped scheme can perform homomorphic evaluations indefinitely without needing to specify in advance, during Setup, a bound on the number of circuit levels.

Memory: Bootstrapping permits short ciphertexts—e.g., encrypted using AES other space-efficient cryptosystem—to be de-compressed to longer ciphertexts that permit homomorphic operations. Bootstrapping thus allows us to save memory by storing data encrypted in the compressed form, while retaining the ability to perform homomorphic operations.

Here, we revisit bootstrapping, viewing it as an optimization rather than a necessity. We also reconsider the scheme FHE that we described in Section 3, viewing the scheme not as an end in itself; but rather as a very powerful SWHE whose performance degrades polynomially in the depth of the circuit being evaluated, as opposed to previous SWHE schemes whose performance degrades polynomially in the degree. In particular, we analyze how efficiently it can evaluate its decryption function, as needed to bootstrap. Not surprisingly, our faster SWHE scheme can also bootstrap faster. The decryption function has only logarithmic depth and can be evaluated homomorphically in time quasi-quadratic in the security parameter (for the RLWE instantiation), giving a bootstrapped scheme with quasi-quadratic per-gate computation overall.

5.2.1 Decryption as a Circuit of Quasi-Linear Size and Logarithmic Depth

Recall that the decryption function is $m=[[\langle c,s \rangle]_q]_2$. Suppose that we are given the "bits" (elements in $R_2$) of s as input, and we want to compute $[[\langle c,s \rangle]_q]_2$ using an arithmetic circuit that has Add and Mult gates over $R_2$. (When we bootstrap, of course we are given the bits of s in encrypted form.) Note that we will run the decryption function homomorphically on level-0 ciphertexts—i.e., when q is small, only polynomial in the security parameter. What is the complexity of this circuit? Most importantly for our purposes, what is its depth and size? The answer is that we can perform decryption with $\tilde{O}(\lambda)$ computation and $O(\log \lambda)$ depth. Thus, in the RLWE instantiation, we can evaluate the decryption function homomorphically using our new scheme with quasi-quadratic computation. (For the LWE instantiation, the bootstrapping computation is quasi-quartic.)

First, let us consider the LWE case, where c and s are n-dimensional integer vectors. Obviously, each product $c[i] \cdot s[i]$ can be written as the sum of at most $\log q$ "shifts" of $s[i]$. These horizontal shifts of $s[i]$ use at most $2 \log q$ columns. Thus, $\langle c,s \rangle$ can be written as the sum of $n \cdot \log q$ numbers, where each number has $2 \log q$ digits. As discussed in [8], we can use the three-for-two trick, which takes as input three numbers in binary (of arbitrary length) and outputs (using constant depth) two binary numbers with the same sum. Thus, with $O(\log(n \cdot \log q))=O(\log n + \log \log q)$ depth and $O(n \log^2 q)$ computation, we obtain two numbers with the desired sum, each having $O(\log n + \log q)$ bits. We can sum the final two numbers with $O(\log \log n + \log \log q)$ depth and $O(\log n + \log q)$ computation. So far, we have used depth $O(\log n + \log \log q)$ and $O(n \log^2 q)$ computation to compute $\langle c,s \rangle$. Reducing this value modulo q is an operation akin to division, for which there are circuits of size poly $\log(q)$ and depth $\log \log q$ Finally, reducing modulo 2 just involves dropping the most significant bits. Overall, since we are interested only in the case where $\log q = O(\log \lambda)$, we have that decryption requires $\tilde{O}(\lambda)$ computation and depth $O(\log \lambda)$.

When we evaluate decryption homomorphically in our RLWE-based scheme, we can use the $R_2$ plaintext space to emulate the simpler plaintext space $Z_2$. Using $Z_2$ the analysis is basically the same as above, except that we mention that the DFT is used to multiply the R-elements that compose the ciphertexts. We note that we can use the techniques of Section 4 to make the final ring dimension $d_0$ completely independent of the depth needed to evaluate the decryption circuit. However, we could bootstrap even without this optimization, as the depth of decryption only grows logarithmically with $d_0=d_L$, whereas the number of levels that can be evaluated grows linearly with $d_L$.

In practice, one would want to tighten up this analysis by reducing the polylogarithmic factors in the computation and the constants in the depth. Most likely this could be done by evaluating decryption using symmetric polynomials [8, 9] or with a variant of the "grade-school addition" approach used in the Gentry-Halevi implementation [10].

5.2.2 Bootstrapping Lazily

Bootstrapping is rather expensive computationally. In particular, the cost of bootstrapping a ciphertext is greater than the cost of a homomorphic operation by approximately a factor of $\lambda$. This suggests the question: can we lower per-gate computation of a bootstrapped scheme by bootstrapping lazily—i.e., applying the refresh procedure only at a 1/L fraction of the circuit levels for some well-chosen L [12]? Here we show that the answer is yes. By bootstrapping lazily for L=θ(log λ), we can lower the per-gate computation by a logarithmic factor.

Let us present this result somewhat abstractly. Suppose that the per-gate computation for a L-level no-bootstrapping FHE scheme is $f(\lambda, L) = \lambda^{a_1} \cdot L^{a_2}$. (We ignore logarithmic factors in f, since they will not affect the analysis, but one can imagine that they add a very small E to the exponent.) Suppose that bootstrapping a ciphertext requires a c-depth circuit. Since we want to be capable of evaluating depth L after evaluating the c levels need to bootstrap a ciphertext, the bootstrapping procedure needs to begin with ciphertexts that can be used in a (c+L)-depth circuit. Consequently, let us say that the computation needed a bootstrap a ciphertext is $g(\lambda, c+L)$ where $g(\lambda, x) = \lambda^{b_1} \cdot x^{b_2}$. The overall per-gate computation is approximately $f(\lambda, L) + g(\lambda, c+L)/L$, a quantity that we seek to minimize.

We have the following lemma.

Lemma 10 Let $f(\lambda, L) = \lambda^{a_1} \cdot L^{a_2}$ and $g(\lambda, L) = \lambda^{b_1} \cdot L^{b_2}$ for constants $b_1 > a_1$ and $b_2 \geq a_2 \geq 1$. Let $h(\lambda, L) = f(\lambda, L) + g(\lambda, c+L)/L$ for $c = \theta(\log \lambda)$. Then, for fixed λ, $h(\lambda, L)$ has a minimum for $L \in [(c-1)/(b_2-1), c/(b_2-1)]$—i.e., at some $L = \theta(\log \lambda)$.

Proof. Clearly $h(\lambda, L) = +\infty$ at L=0, then it decreases toward a minimum, and finally it eventually increases again as L goes toward infinity. Thus, $h(\lambda, L)$ has a minimum at some positive value of L. Since $f(\lambda, L)$ is monotonically increasing (i.e., the derivative is positive), the minimum must occur where the derivative of $g(\lambda, c+L)/L$ is negative. We have $$\frac{d}{dL} g(\lambda, c+L)/L = g'(\lambda, c+L)/L - g(\lambda, c+L)/L^2$$

$$= b_2 \cdot \lambda^{b_1} \cdot (c+L)^{b_2-1}/L - \lambda^{b_1} \cdot (c+L)^{b_2}/L^2$$

$$= (\lambda^{b_1} \cdot (c+L)^{b_2-1}/L^2) \cdot (b_2 \cdot L - c - L),$$

which becomes positive when $L \geq c/(b_2-1)$—i.e., the derivative is negative only when $L = O(\log \lambda)$. For $L < (c-1)/(b_2-1)$, we have that the above derivative is less than $-\lambda^{b_1} \cdot (c+L)^{b_2-1}/L^2$, which dominates the positive derivative of f. Therefore, for large enough value of λ, the value $h(\lambda, L)$ has its minimum at some $L \in [(c-1)/(b_2-1), c/(b_2-1)]$.

This lemma basically says that, since homomorphic decryption takes θ(log λ) levels and its cost is super-linear and dominates that of normal homomorphic operations (FHE.Add and FHE.Mult), it makes sense to bootstrap lazily—in particular, once every θ(log λ) levels. (If one bootstrapped even more lazily than this, the super-linear cost of bootstrapping begins to ensure that the (amortized) per-gate cost of bootstrapping alone is increasing.) It is easy to see that, since the per-gate computation is dominated by bootstrapping, bootstrapping lazily every θ(log λ) levels reduces the per-gate computation by a factor of θ(log λ).

5.3 Batching the Bootstrapping Operation

Suppose that we are evaluating a circuit homomorphically, that we are currently at a level in the circuit that has at least d gates (where d is the dimension of our ring), and that we want to bootstrap (refresh) all of the ciphertexts corresponding to the respective wires at that level. That is, we want to homomorphically evaluate the decryption function at least d times in parallel. This seems like an ideal place to apply batching.

However, there are some nontrivial problems. In Section 5.1, our focus was rather limited. For example, we did not consider whether homomorphic operations could continue after the batched computation. Indeed, at first glance, it would appear that homomorphic operations cannot continue, since, after batching, the encrypted data is partitioned into non-interacting relatively-prime plaintext slots, whereas the whole point of homomorphic encryption is that the encrypted data can interact (within a common plaintext slot). Similarly, we did not consider homomorphic operations before the batched computation. Somehow, we need the input to the batched computation to come pre-partitioned into the different plaintext slots.

What we need are Pack and Unpack functions that allow the batching procedure to interface with "normal" homomorphic operations. One may think of the Pack and Unpack functions as an on-ramp to and an exit-ramp from the "fast lane" of batching. Let us say that normal homomorphic operations will always use the plaintext slot $R_{p_1}$. Roughly, the Pack function should take a bunch of ciphertexts $c_1, \ldots, c_d$ that encrypt messages $m_1, \ldots, m_d \in Z_p$ under key $s_1$ for modulus q and plaintext slot $R_{p_1}$, and then aggregate them into a single ciphertext c under some possibly different key $s_2$ for modulus q, so that correctness holds with respect to all of the different plaintext slots—i.e. $m_i = [[\langle c, s_2 \rangle]_q]_{p_i}$ for all i. The Pack function thus allows normal homomorphic operations to feed into the batch operation. The Unpack function should accept the output of a batched computation, namely a ciphertext c' such that $m_i = [[\langle c', s_1 \rangle]_q]_{p_i}$ for all i, and then de-aggregate this ciphertext by outputting ciphertexts $c_1, \ldots, c_d$, under some possibly different common secret key $s_2$, such that $m_i = [[\langle c_i, s_2 \rangle]_q]_{p_1}$ for all i. Now that all of the ciphertexts are under a common key and plaintext slot, normal homomorphic operations can resume. With such Pack and Unpack functions, we could indeed batch the bootstrapping operation. For circuits of large width (say, at least d) we could reduce the per-gate bootstrapping computation by a factor of d, making it only quasi-linear in λ. Assuming the Pack and Unpack functions have complexity at most quasi-quadratic in d (per-gate this is only quasi-linear, since Pack and Unpack operate on d gates), the overall per-gate computation of a batched-bootstrapped scheme becomes only quasi-linear.

Here, we describe suitable Pack and Unpack functions. These functions will make heavy use of the automorphisms $\sigma_{i \to j}$ over R that map elements of $p_i$ to elements of $p_j$. (See Section 5.1.1.) We note that Smart and Vercauteren[23] used these automorphisms to construct something similar to our Pack function (though for unpacking they resorted to bootstrapping). We also note that Lyubashevsky, Peikert and Regev [15] used these automorphisms to permute the ideal factors $q_i$ of the modulus q, which was an essential tool toward their proof of the pseudorandomness of RLWE.

Toward Pack and Unpack procedures, we begin with the observation that if m is encoded as a number in $\{0, \ldots, p-1\}$ and if $m = [[\langle c, s \rangle]_q]_{p_i}$, then $m = [[\langle \sigma_{i \to j}(c), \sigma_{i \to j}(s) \rangle]_q]_{p_j}$. That is, we can switch the plaintext slot but leave the decrypted message unchanged by applying the same automorphism to the ciphertext and the secret key. (These facts follow from the fact that $\sigma_{i \to j}$ is a homomorphism, that it maps elements of $p_i$ to elements of $p_j$, and that it fixes integers.) Of course, then we have a problem: the ciphertext is now under a different key, whereas we may want the ciphertext to be under the same key as other ciphertexts. To get the ciphertexts to be back under the same key, we simply use the SwitchKey algorithm to switch all of the ciphertexts to a new common key.

Some technical remarks before we describe Pack/Unpack more formally: We mention again that E.PublicKeyGen is modified in the obvious way so that $A \cdot s = p \cdot e$ rather than $2 \cdot e$, and that this modification induces a similar modification in SwitchKeyGen. Also, let $u \in R$ be a short element such that $u \in 1 + p_1$ and $\mu \in p_j$ for all $j \neq 1$. It is obvious that such a u with coefficients in $(-p/2, p/2]$ can be computed efficiently by first picking any element u' such that $u' \in 1 + p_1$ and $u' \in p_j$ for all $j \neq 1$, and then reducing the coefficients of u' modulo p.

PackSetup($s_1, s_2$): Takes as input two secret keys $s_1, s_2$. For all $i \in [1,d]$, it runs $\tau_{\sigma_{1 \to i}(s_1) \to s_2} \leftarrow \text{SwitchKeyGen}(\sigma_{1 \to i}(s_1), s_2)$.

Pack($\{c_i\}_{i=1}^d, \{\tau_{\sigma_{1 \to i}(s_1) \to s_2}\}_{i=1}^d$): Takes as input ciphertexts $c_1, \ldots, c_d$ such that $m_i = [[\langle c_i, s_1 \rangle]_q]_{p_1}$ and $0 = [[\langle c_i, s_1 \rangle]_q]_{p_j}$ for all $j \neq 1$, and also some auxiliary information output by PackSetup. For all i, it does the following:

Computes $c_i^* \leftarrow \sigma_{1 \to i}(c_i)$. (Observe: We have $m_i = [[\langle c_i^*, \sigma_{1 \to i}(s_1) \rangle]_q]_{p_i}$ while $0 = [[\langle c_i^*, \sigma_{1 \to i}(s_1) \rangle]_q]_{p_j}$ for all $j \neq i$.)

Runs $c_i^\dagger \leftarrow \text{SwitchKey}(\tau_{\sigma_{1 \to i}(s_1) \to s_2}, c_i^*)$ (Observe: Assuming the noise does not wrap, we have that $m_i = [[\langle c_i^\dagger, s_2 \rangle]_q]_{p_i}$ and $0 = [[\langle c_i^\dagger, s_2 \rangle]_q]_{p_j}$ for all $j \neq i$.)

Finally, it outputs $c \leftarrow \sum_{i=1}^d c_i^\dagger$. (Observe: Assuming the noise does not wrap, we have $m_i = [[\langle c, s_2 \rangle]_q]_{p_i}$ for all i.)

UnpackSetup($s_1, s_2$): Takes as input secret keys $s_1, s_2$. For all $i \in [1,d]$, it runs $\tau_{\sigma_{i \to 1}(s_1) \to s_2} \leftarrow \text{SwitchKeyGen}(\sigma_{i \to 1}(s_1), s_2)$.

Unpack($c, \{\tau_{\sigma_{i \to 1}(s_1) \to s_2}\}_{i=1}^d$): Takes as input a ciphertext c such that $m_i = [[\langle c, s_1 \rangle]_q]_{p_i}$ for all i, and also some auxiliary information output by UnpackSetup. For all i, it does the following:

Computes $c_i \leftarrow u \cdot \sigma_{i \to 1}(c)$. (Observe: Assuming the noise does not wrap, $m_i = [[\langle c_i, \sigma_{i \to 1}(s_1) \rangle]_q]_{p_i}$ and $0 = [[\langle c_i, \sigma_{i \to 1}(s_1) \rangle]_q]_{p_j}$ for all $j \neq 1$.)

Outputs $c_i^* \leftarrow \text{SwitchKey}(\tau_{\sigma_{i \to 1}(s_1) \to s_2}, c_i)$. (Observe: Assuming the noise does not wrap, $m_i = [[\langle c_i^*, s_2 \rangle]_q]_{p_1}$ and $0 = [[\langle c_i^*, s_2 \rangle]_q]_{p_j}$ for all $j \neq 1$.)

Splicing the Pack and Unpack procedures into our scheme FHE is tedious but pretty straightforward. Although these procedures introduce many more encrypted secret keys, this does not cause a circular security problem as long as the chain of encrypted secret keys is acyclic; then the standard hybrid argument applies. After applying Pack or Unpack, one may apply modulus reduction to reduce the noise back down to normal.

5.4 More Fun with Funky Plaintext Spaces

In some cases, it might be nice to have a plaintext space isomorphic to $Z_p$ for some large prime p—e.g., one exponential in the security parameter. So far, we have been using $R_p$ as our plaintext space, and (due to the rounding step in modulus switching) the size of the noise after modulus switching is proportional to p. When p is exponential, our previous approach for handling the noise (which keeps the magnitude of the noise polynomial in $\lambda$) obviously breaks down.

To get a plaintext space isomorphic to $Z_p$ that works for exponential p, we need a new approach. Instead of using an integer modulus, we will use an ideal modulus I (an ideal of R) whose norm is some large prime p, but such that we have a basis $B_I$ of I that is very short—e.g. $\|B_I\| = O(\text{poly}(d) \cdot p^{1/d})$ Using an ideal plaintext space forces us to modify the modulus switching technique nontrivially.

Originally, when our plaintext space was $R_2$ each of the moduli in our "ladder" was odd—that is, they were all congruent to each other modulo 2 and relatively prime to 2. Similarly, we will have to choose each of the moduli in our new ladder so that they are all congruent to each other modulo I and relatively prime to I. (This just seems necessary to get the scaling to work, as the reader will see shortly.)

This presents a difficulty, since we wanted the norm of I to be large—e.g., exponential in the security parameter. If we choose our moduli $q_j$ to be integers, then we have that the integer $q_{j+1} - q_j \in I$—in particular, $q_{j+1} - q_j$ is a multiple of I's norm, implying that the $q_j$'s are exponential in the security parameter. Having such large $q_j$'s does not work well in our scheme, since the underlying lattice problems becomes easy when $q_j/B$ is exponential in d where B is a bound of the noise distribution of fresh ciphertexts, and since we need B to remain quite small for our new noise management approach to work effectively. So, instead, our ladder of moduli will also consist of ideals—in particular, principle ideals $(q_j)$ generated by an element of $q_j \in R$. Specifically, it is easy to generate a ladder of $q_j$'s that are all congruent to 1 moduli I by sampling appropriately-sized elements $q_j$ of the coset $1 + I$ (using our short basis of I), and testing whether the principal ideal $(q_j)$ generated by the element has appropriate norm.

Now, let us reconsider modulus switching in light of the fact that our moduli are now principal ideals. We need an analogue of Lemma 4 that works for ideal moduli.

Let us build up some notation and concepts that we will need in our new lemma. Let $P_q$ be the half-open parallelepiped associated to the rotation basis of $q \in R$. The rotation basis $B_q$ of q is the d-dimensional basis formed by the coefficient vectors of the polynomials $x^i q(x) \mod f(x)$ for $i \in [0, d-1]$. The associated parallelepiped is $P_q = \{\Sigma z_i \cdot b_i : b_i \in B_q, z_i \in [-1/2, 1/2)\}$. We need two concepts associated to this parallelepiped. First, we will still use the notation $[a]_q$, but where q is now an R-element rather than integer. This notation refers to a reduced modulo the rotation basis $B_q$ of q—i.e., the element $[a]_q$ such that $[a]_q - a \in qR$ and $[a]_q \in P_q$. Next, we need notions of the inner radius and outer radius $r_{q,out}$ of $P_q$—that is, the largest radius of a ball that is circumscribed by $P_q$, and the smallest radius of a ball that circumscribes $P_q$. It is possible to choose q so that the ratio $r_{q,out}/r_{q,in}$ is poly(d). For example, this is true when q is an integer. More generally, if q is sampled uniformly from a ball of radius R with center $T \cdot e_1$ for $T!R$, so that q's coefficient vector is "almost parallel" to $e_1$, one can show (for appropriate values of R and T) that $r_{q,out}/r_{q,in}$ will be poly(d). Choosing q in such a manner, one can also ensure that $\|q^{-1}\| = 1/\|q\|$ up to a poly(d) factor. ($\|q^{-1}\|$ refers to the Euclidean norm of the coefficient vector of the inverse of q in the overlying field $Q(x)/f(x)$.) For convenience, let $\alpha(d)$ be a polynomial such that $\|q^{-1}\| = 1/\|q\|$ up to a $\alpha(d)$ factor and moreover $r_{q,out}/r_{q,in}$ is at most $\alpha(d)$ with overwhelming probability. For such an $\alpha$, we say q is $\alpha$-good.

Of course, not every (not even a high proportion) of primes are the norm of a principal ideal generated by an $\alpha$-good $q \in R$. But there many such primes, and that may suffice for many applications.

Below, we will also use $r_{B,out}$ to denote the outer radius associated to the parallelepiped determined by basis B.

Lemma 11 Let $q_1$ and $q_2$, $\|q_1\| < \|q_2\|$, be two $\alpha$-good elements of R. Let $B_I$ be a short basis (with outer radius $r_{B_I,out}$) of an ideal I of R such that $q_1 - q_2 \in I$. Let c be an integer vector and $c' \leftarrow \text{Scale}(c, q_2, q_1, I)$—that is, c' is an R-element at most $2r_{B_I,out}$ distant from $(q_1/q_2) \cdot c$ such that $c' - c \in I$. Then, for any s with $$\|[\langle c, s \rangle]_{q_2}\| < \frac{(r_{q_2,in}/\alpha(d)^2 - (\|q_2\|/\|q_1\|)\gamma_R \cdot 2r_{B_I,out} \cdot f_1^{(R)}(s))}{(\alpha(d) \cdot \gamma_R^2)}$$

we have $$[\langle c',s\rangle]_{q_1} = [\langle c,s\rangle]_{q_2} \mod I \text{ and}$$

$$\|[\langle c',s\rangle]_{q_1}\| < \alpha(d)\cdot\gamma_R^2 \cdot (\|q_1\|/\|q_2\|)\cdot\|[\langle c,s\rangle]_{q_2}\| + \gamma_R \cdot 2r_{B_I,out}\cdot l_1^{(R)}(s)$$

where $l_1^{(R)}(s)$ is defined as $\Sigma_i \|s[i]\|$.

(Proof Omitted.)

With this extension of modulus switching, we can use plaintext spaces that are very large (exponential in the security parameter) and that have properties that are often desirable (such as being isomorphic to a large prime field).

5.5 Other Optimizations

If one is willing to assume circular security, the keys $\{s_j\}$ may all be the same, thereby permitting a public key of size independent of L.

While it is not necessary, squashing may still be a useful optimization in practice, as it can be used to lower the depth of the decryption function, thereby reducing the size of the largest modulus needed in the scheme, which may improve efficiency.

6 Summary

Our RLWE-based FHE scheme without bootstrapping requires only $\tilde{O}(\lambda \cdot L^3)$ per-gate computation where L is the depth of the circuit being evaluated, while the bootstrapped version has only $\tilde{O}(\lambda^2)$ per-gate computation. For circuits of width $\Omega(\lambda)$, we can use batching to reduce the per-gate computation of the bootstrapped version by another factor of $\lambda$. In follow-on work, Gentry, Halevi and Smart [11] show that the per-gate overhead can be further reduced to polylogarithmic in the security parameter.

While these schemes should perform significantly better than previous FHE schemes, we caution that the polylogarithmic factors in the per-gate computation are large.

Another way to view exemplary embodiments of the invention is in terms of both a noise "ceiling" and a noise "floor." The noise ceiling is the modulus. Recall that a ciphertext c mod p has vector coefficients on the range (−p/2,p/2). If the noise becomes too large relative to the modulus (the range for coefficients defined by the modulus) then decryption of the ciphertext may fail and correctness is lost. As previously noted, it is not just the ratio of the noise to the "noise ceiling" that is important—one must also consider the (absolute) magnitude of the noise, especially in multiplications. Since multiplications have the capacity to increase the magnitude of the noise exponentially or even at doubly exponential growth (e.g., $x^{2^L}$ for L multiplications/levels), the magnitude of the noise constrains the number of levels L that can be used. This is what leads the bootstrapping approach only to enable logarithmic depth circuits. Thus, the magnitude of the noise may be considered the noise floor—an upper bound on the size of the actual noise. The goal is to have the noise floor meet the noise ceiling as slowly as possible since this will allow for more levels and more operations to be performed homomorphically.

Using exemplary embodiments of the invention, the noise floor remains fixed and the noise ceiling is reduced by a fixed factor (p/q) due to modulus switching. To maintain control over the approach of the noise ceiling, it is preferable to perform the modulus switching (refresh function) at least after each multiplication. Since addition does not lead to noise growth as fast as multiplication does, it may be possible to perform more than one addition before refreshing the ciphertext with the modulus switching technique.

In comparison to BV [3], it is noted that BV uses dimension reduction which is a kind of "bundled" key-switching and modulus-switching step. The dimension reduction is applied once (once each epoch between bootstrappings) immediately before bootstrapping to get the ciphertext to be very small (which simplifies the bootstrapping process). BV lets the noise grow uncontrolled (e.g., exponentially) and uses dimension reduction at the end (right before bootstrapping). Since the noise is allowed to grow uncontrolled, big parameters must be used (the ciphertexts are vectors of big dimension with big coefficients).

Contrasting with BV, the exemplary embodiments of the invention use modulus switching as a separate step, not bundled with key switching per se. Since this step merely involves multiplying by a known fraction and rounding appropriately, it can be performed even without any public key material in particular without the "evaluation key" that BV needs to perform dimension reduction. Furthermore, the exemplary embodiments of the invention use modulus switching iteratively as an aggressive noise management technique rather than only as a precursor to bootstrapping.

7. References

[1] B. Applebaum, D. Cash, C. Peikert, and A. Sahai. Fast cryptographic primitives and circular-secure encryption based on hard learning problems. In CRYPTO, volume 5677 of Lecture Notes in Computer Science, pages 595-618. Springer, 2009.

[2] D. Boneh, E.-J. Goh, and K. Nissim. Evaluating 2-DNF formulas on ciphertexts. In Proceedings of Theory of Cryptography Conference 2005, volume 3378 of LNCS, pages 325-342, 2005.

[3] Z. Brakerski and V. Vaikuntanathan, Efficient fully homomorphic encryption from (standard) lwe. Manuscript, to appear in FOCS 2011, available at cprint.iacr.org/2011/344.

[4] Z. Brakerski and V. Vaikuntanathan. Fully homomorphic encryption from ring lwe and security for key dependent messages. Manuscript, to appear in CRYPTO 2011.

[5] J.-S. Coron, A. Mandal, D. Naccache, and M. Tibouchi. Fully-homomorphic encryption over the integers with shorter public-keys. Manuscript, to appear in Crypto 2011.

[6] M. Dijk, C. Gentry, S. Halevi, and V. Vaikuntanathan. Fully homomorphic encryption over the integers. In Advances in Cryptology—EUROCRYPT '10 volume 6110 of Lecture Notes in Computer Science, pages 24-43. Springer, 2010. Full version available on-line from eprint.iacr.org/2009/616.

[7] C. Gentry. A fully homomorphic encryption scheme. PhD thesis, Stanford University, 2009. Crypt° stanford.edu/craig.

[8] C. Gentry. Fully homomorphic encryption using ideal lattices. In M. Mitzenmacher, editor, STOC, pages 169-178, ACM, 2009.

[9] C. Gentry and S. Halevi, Fully homomorphic encryption without squashing using depth-3 arithmetic circuits. Manuscript, to appear in FOCS 2011, available at eprint.iacr.org/2011/279.

[10] C. Gentry and S. Halevi, Implementing gentry's fully-homomorphic encryption scheme. In EUROCRYPT, volume 6632 of Lecture Notes in Computer Science, pages 129-148. Springer, 2011.

[11] C. Gentry, S. Halevi, and N. P. Smart. Fully homomorphic encryption with polylog overhead. Manuscript at eprint.iacr.org/20111566, 2011.

[12] S. Halevi, 2011. Personal communication.

[13] Y. Ishai and A. Paskin. Evaluating branching programs on encrypted data. In S. P. Vadhan, editor, TCC, volume 4392 of Lecture Notes in Computer Science, pages 575-594. Springer, 2007.

[14] K. Lauter, M. Naehrig, and V. Vaikuntanathan. Can homomorphic encryption be practical? Manuscript at eprint.iacr.org/2011/405, 2011.

[15] V. Lyubashevsky, C. Peikert, and O. Regev. On ideal lattices and learning with errors over rings. In EUROCRYPT, volume 6110 of Lecture Notes in Computer Science, pages 1-23, 2010.

[16] C. A. Melchor, P. Gaborit, and J. Herranz. Additively homomorphic encryption with-operand multiplications. In T. Rabin, editor, CRYPTO, volume 6223 of Lecture Notes in Computer Science, pages 138-154. Springer, 2010.

[17] D. MICCIANCIO. Generalized compact knapsacks, cyclic lattices, and efficient one-way functions. Computational Complexity, 16(4): 365-411, Dec. 2007. Preliminary version in FOCS 2002.

[18] C. Peikert. Public-key cryptosystems from the worst-case shortest vector problem: extended abstract. In STOC, pages 333-342. ACM, 2009.

[19] O. Regev. On lattices, learning with errors, random linear codes, and cryptography. In H N. Gabow and R. Fagin, editors, STOC, pages 84-93. ACM, 2005.

[20] O. Regev. The learning with errors problem (invited survey). In IEEE Conference on Computational Complexity, pages 191-204. IEEE Computer Society, 2010.

[21] R. Rivest, L. Adleman, and M. L. Dertouzos. On data banks and privacy homomorphisms. In Foundations of Secure Computation, pages 169-180, 1978.

[22] N. P. Smart and F. Vercauteren. Fully homomorphic encryption with relatively small key and ciphertext sizes. In Public Key Cryptography PKC '10, volume 6056 of Lecture Notes in Computer Science, pages 420-443, Springer 2010.

[23] N P. Smart and F. Vercauteren. Fully homomorphic SIMD operations. Manuscript at eprint.iacr.org/2011/133, 2011.

[24] D. Stehle and R. Steinfeld. Faster fully homomorphic encryption. In ASIACRYPT, volume 6477 of Lecture Notes in Computer Science, pages 377-394, Springer, 2010.

8. Apparatus and Computer Programs

FIG. 1 illustrates a block diagram of an exemplary system in which various exemplary embodiments of the invention may be implemented. The system 100 may include at least one circuitry 102 (e.g., circuitry element, circuitry components, integrated circuit) that may in certain exemplary embodiments include at least one processor 104. The system 100 may also include at least one memory 106 (e.g., a volatile memory device, a non-volatile memory device), and/or at least one storage 108. The storage 108 may include a non-volatile memory device (e.g., EEPROM, ROM, PROM, RAM, DRAM, SRAM, flash, firmware, programmable logic, etc.), magnetic disk drive, optical disk drive and/or tape drive, as non-limiting examples. The storage 108 may comprise an internal storage device, an attached storage device and/or a network accessible storage device, as non-limiting examples. The system 100 may include at least one program logic 110 including code 112 (e.g., program code) that may be loaded into the memory 106 and executed by the processor 104 and/or circuitry 102. In certain exemplary embodiments, the program logic 110, including code 112, may be stored in the storage 108. In certain other exemplary embodiments, the program logic 110 may be implemented in the circuitry 102. Therefore, while FIG. 1 shows the program logic 110 separately from the other elements, the program logic 110 may be implemented in the memory 106 and/or the circuitry 102, as non-limiting examples.

The system 100 may include at least one communications component 114 that enables communication with at least one other component, system, device and/or apparatus. As non-limiting examples, the communications component 114 may include a transceiver configured to send and receive information, a transmitter configured to send information and/or a receiver configured to receive information. As a non-limiting example, the communications component 114 may comprise a modem or network card. The system 100 of FIG. 1 may be embodied in a computer or computer system, such as a desktop computer, a portable computer or a server, as non-limiting examples. The components of the system 100 shown in FIG. 1 may be connected or coupled together using one or more internal buses, connections, wires and/or (printed) circuit boards, as non-limiting examples.

It should be noted that in accordance with the exemplary embodiments of the invention, one or more of the circuitry 102, processor(s) 104, memory 106, storage 108, program logic 110 and/or communications component 114 may store one or more of the various items (e.g., public/private key(s), ciphertexts, encrypted items, matrices, variables, equations, formula, operations, operational logic, logic) discussed herein. As a non-limiting example, one or more of the above-identified components may receive and/or store the information (e.g., to be encrypted, resulting from decryption) and/or the ciphertext (e.g., to be decrypted, to be operated on homomorphically, resulting from encryption). As a further non-limiting example, one or more of the above-identified components may receive and/or store the encryption function(s) and/or the decryption function(s), as described herein.

The exemplary embodiments of this invention may be carried out by computer software implemented by the processor 104 or by hardware, or by a combination of hardware and software. As a non-limiting example, the exemplary embodiments of this invention may be implemented by one or more integrated circuits. The memory 106 may be of any type appropriate to the technical environment and may be implemented using any appropriate data storage technology, such as optical memory devices, magnetic memory devices, semiconductor-based memory devices, fixed memory and removable memory, as non-limiting examples. The processor 104 may be of any type appropriate to the technical environment, and may encompass one or more of microprocessors, general purpose computers, special purpose computers and processors based on a multi-core architecture, as non-limiting examples.

9. Further Exemplary Embodiments

There is one further extension of the exemplary embodiments of the invention that merits brief consideration. As described above, in some exemplary embodiments the noise (i.e., the magnitude of the noise) remains (relatively, substantially) constant and low level while the modulus decreases. Thus, the gap between the modulus (e.g., ceiling) and the noise (e.g., floor) eventually runs out. As noted above, and as non-limiting examples, one can set the initial modulus big enough to enable the polynomial depth circuit to be executed by the time the gap runs out or one can utilize bootstrapping once the gap runs out. Also as noted above, compared with the bootstrapping approach's logarithmic depth for circuits, the exemplary embodiments of the invention enable a polynomial depth circuit of multiplications starting with parameters that are only polynomial in size.

Another way to look at exemplary embodiments of the invention, that is instead of keeping the floor (magnitude of noise) constant and slowly reducing the ceiling (modulus), is by normalizing to the modulus. For example, set the modulus to 1 and utilize fractions (i.e., values less than 1). In this case, the noise is represented as a fractional part of the coefficients and proceeds to increase until it approaches the modulus (which has a value of 1). While this would appear to maintain the ceiling as a constant and slowly increase the floor until one runs out of room, it is simply an extension of the above-described concepts with the coefficients normalized to the modulus (as evident by the modulus having a value of 1). In particular, note that the growth of the noise would be similar, if not identical, in speed and/or value to the described reduction of the modulus. In both cases, it is a technique that involves maintaining one of the floor or ceiling at a (relatively, substantially) constant value and having the other one approach (e.g., decrease for the ceiling or increase for the floor) by utilizing what amounts to different moduli. Modulus switching essentially suggests that a particular value of the modulus is irrelevant since it is the magnitude of the noise that may be accounted for instead (e.g., as opposed to the ratio of noise to modulus).

Below are further descriptions of various non-limiting, exemplary embodiments of the invention. The below-described exemplary embodiments are numbered separately for clarity purposes. This numbering should not be construed as entirely separating the various exemplary embodiments since aspects of one or more exemplary embodiments may be practiced in conjunction with one or more other aspects or exemplary embodiments.

(1) In one exemplary embodiment of the invention, and as shown in FIG. 3, a method comprising: receiving (301) a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perform at least one operation on the at least two ciphertexts and obtain a resulting ciphertext, where the refresh function operates to prevent growth of the magnitude of noise for a ciphertext while reducing the modulus of the ciphertext without using the secret key, where the refresh function utilizes a modulus switching technique that comprises transforming a first ciphertext c modulo q into a second ciphertext c' modulo p while preserving correctness, where the modulus switching technique includes scaling by p/q and rounding, where p<q, where the encryption scheme enables homomorphic operations to be performed on ciphertexts encoded and operated on in accordance with the encryption scheme; performing (302) at least one operation on the first ciphertext and the second ciphertext, using the at least one operation function, to obtain a third ciphertext; and reducing (303) a noise level of the third ciphertext by using the refresh function.

A method as above, where application of the refresh function to a ciphertext prevents growth of the magnitude of noise for the ciphertext while reducing a range of coefficients for the ciphertext. A method as in any above, where the at least one operation function comprises at least one of an addition and a multiplication, where in response to a multiplication being performed the refresh function is applied. A method as in any above, where the at least one operation function comprises at least one of an addition and a multiplication, where in response to a multiplication being desired the refresh function is applied to at least one input of the multiplication. A method as in any above, where the encryption scheme enables evaluation of a polynomial depth circuit of multiplications.

A method as in any above, where the encryption scheme enables evaluation of a polynomial depth circuit of multiplications without (performing, utilizing) bootstrapping. A method as in any above, further comprising: batching evaluations of a plurality of ciphertexts across a same circuit. A method as in any above, further comprising: performing bootstrapping (e.g., for optimization). A method as in any above, further comprising: performing batching of evaluations of a plurality of ciphertexts across a same circuit while also performing bootstrapping. A method as in any above, further comprising: performing squashing.

A computer program comprising machine readable instructions which when executed by an apparatus control it to perform the method as in any one of the preceding claims. A method as in any above, implemented as a computer program. A method as in any above, implemented as a program of instructions stored (e.g., tangibly embodied) on a program storage device (e.g., at least one memory, at least one computer-readable medium) and executable by a computer (e.g., at least one processor). A method as in any above, further comprising one or more aspects of the exemplary embodiments of the invention as described further herein.

(2) In another exemplary embodiment of the invention, and as shown in FIG. 3, a computer-readable storage medium storing program instructions, execution of the program instructions resulting in operations comprising: receiving (301) a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perform at least one operation on the at least two ciphertexts and obtain a resulting ciphertext, where the refresh function operates to prevent growth of the magnitude of noise for a ciphertext while reducing the modulus of the ciphertext without using the secret key, where the refresh function utilizes a modulus switching technique that comprises transforming a first ciphertext c modulo q into a second ciphertext c' modulo p while preserving correctness, where the modulus switching technique includes scaling by p/q and rounding, where p<q, where the encryption scheme enables homomorphic operations to be performed on ciphertexts encoded and operated on in accordance with the encryption scheme; performing (302) at least one operation on the first ciphertext and the second ciphertext, using the at least one operation function, to obtain a third ciphertext; and reducing (303) a noise level of the third ciphertext by using the refresh function.

A computer readable medium as in any above, further comprising one or more additional aspects of the exemplary embodiments of the invention as described herein.

(3) In a further exemplary embodiment of the invention, an apparatus comprising: at least one processor configured to receive a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perform at least one operation on the at least two ciphertexts and obtain a resulting ciphertext, where the refresh function operates to prevent growth of the magnitude of noise for a ciphertext while reducing the modulus of the ciphertext without using the secret key, where the refresh function utilizes a modulus switching technique that comprises transforming a first ciphertext c modulo q into a second ciphertext c' modulo p while preserving correctness, where the modulus switching technique includes scaling by p/q and rounding, where p<q, where the encryption scheme enables homomorphic operations to be performed on ciphertexts encoded and operated on in accordance with the encryption scheme; and at least one memory configured to store the first ciphertext and the second ciphertext, where the at least one processor is further configured to perform at least one operation on the first ciphertext and the second ciphertext, using the at least one operation function, to obtain a third ciphertext; and to reduce a noise level of the third ciphertext by using the refresh function.

An apparatus as in any above, further comprising one or more additional aspects of the exemplary embodiments of the invention as described herein.

(4) In another exemplary embodiment of the invention, an apparatus comprising: means for receiving (e.g., at least one input, at least one processor, at least one receiver) a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perform at least one operation on the at least two ciphertexts and obtain a resulting ciphertext, where the refresh function operates to prevent growth of the magnitude of noise for a ciphertext while reducing the modulus of the ciphertext without using the secret key, where the refresh function utilizes a modulus switching technique that comprises transforming a first ciphertext c modulo q into a second ciphertext c' modulo p while preserving correctness, where the modulus switching technique includes scaling by p/q and rounding, where p<q, where the encryption scheme enables homomorphic operations to be performed on ciphertexts encoded and operated on in accordance with the encryption scheme; means for performing (e.g., at least one processor, at least one circuit, at least one function, at least one logic circuit, at least one integrated circuit) at least one operation on the first ciphertext and the second ciphertext, using the at least one operation function, to obtain a third ciphertext; and means for reducing (e.g., at least one processor, at least one circuit, at least one function, at least one logic circuit, at least one integrated circuit) a noise level of the third ciphertext by using the refresh function.

An apparatus as in any above, further comprising means for storing at least one ciphertext (e.g., the first ciphertext, the second ciphertext, and/or the third ciphertext). An apparatus as in any above, further comprising one or more additional aspects of the exemplary embodiments of the invention as described herein.

(5) In a further exemplary embodiment of the invention, an apparatus comprising: reception circuitry configured to receive a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perform at least one operation on the at least two ciphertexts and obtain a resulting ciphertext, where the refresh function operates to prevent growth of the magnitude of noise for a ciphertext while reducing the modulus of the ciphertext without using the secret key, where the refresh function utilizes a modulus switching technique that comprises transforming a first ciphertext c modulo q into a second ciphertext c' modulo p while preserving correctness, where the modulus switching technique includes scaling by p/q and rounding, where p<q, where the encryption scheme enables homomorphic operations to be performed on ciphertexts encoded and operated on in accordance with the encryption scheme; operation circuitry configured to perform at least one operation on the first ciphertext and the second ciphertext, using the at least one operation function, to obtain a third ciphertext; and noise reduction circuitry (e.g., control circuitry) configured to reduce a noise level of the third ciphertext by using the refresh function.

An apparatus as in any above, further comprising one or more additional aspects of the exemplary embodiments of the invention as described herein.

(6) In another exemplary embodiment of the invention, an apparatus comprising: a first system configured to receive a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perform at least one operation on the at least two ciphertexts and obtain a resulting ciphertext, where the refresh function operates to prevent growth of the magnitude of noise for a ciphertext while reducing the modulus of the ciphertext without using the secret key, where the refresh function utilizes a modulus switching technique that comprises transforming a first ciphertext c modulo q into a second ciphertext c' modulo p while preserving correctness, where the modulus switching technique includes scaling by p/q and rounding, where p<q, where the encryption scheme enables homomorphic operations to be performed on ciphertexts encoded and operated on in accordance with the encryption scheme; a second system configured to perform at least one operation on the first ciphertext and the second ciphertext, using the at least one operation function, to obtain a third ciphertext; and a third system configured to reduce a noise level of the third ciphertext by using the refresh function.

An apparatus as in any above, further comprising one or more additional aspects of the exemplary embodiments of the invention as described herein.

Figure 4:
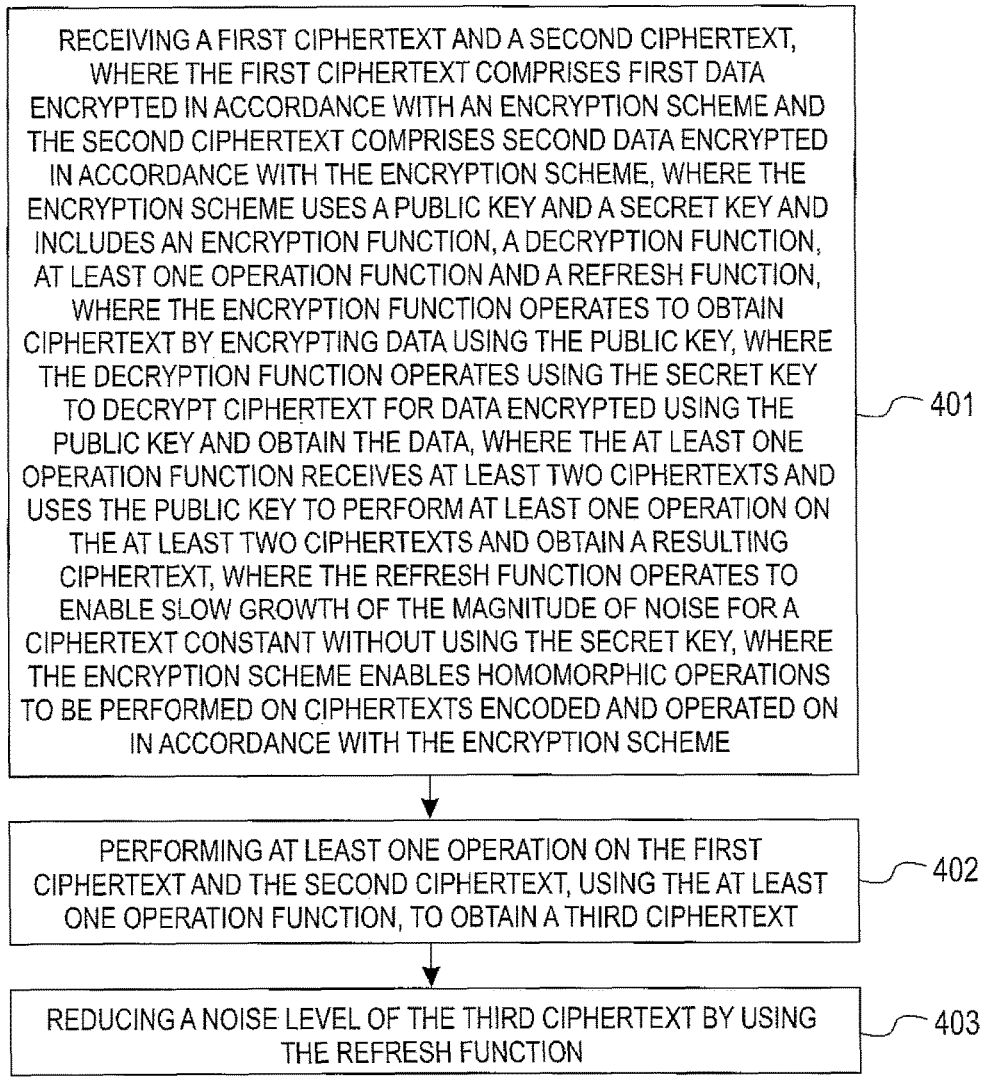
FIG. 4 depicts a logic flow diagram illustrative of the operation of another exemplary method, and the operation of another exemplary computer program, in accordance with the exemplary embodiments of this invention.

(7) In one exemplary embodiment of the invention, and as shown in FIG. 4, a method comprising: receiving (401) a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perform at least one operation on the at least two ciphertexts and obtain a resulting ciphertext, where the refresh function operates to enable slow growth of the magnitude of noise for a ciphertext while maintaining the modulus of the ciphertext constant without using the secret key, where the encryption scheme enables homomorphic operations to be performed on ciphertexts encoded and operated on in accordance with the encryption scheme; performing (402) at least one operation on the first ciphertext and the second ciphertext, using the at least one operation function, to obtain a third ciphertext; and reducing (403) a noise level of the third ciphertext by using the refresh function.

A method as above, where the modulus of the ciphertext is maintained at a value of 1. A method as in any above, where the magnitude of noise for the ciphertext is represented as a fractional part of coefficients for the ciphertext. A method as in any above, where the at least one operation function comprises at least one of an addition and a multiplication, where in response to a multiplication being performed the refresh function is applied. A method as in any above, where the encryption scheme enables evaluation of a polynomial depth circuit of multiplications.

A computer program comprising machine readable instructions which when executed by an apparatus control it to perform the method as in any one of the preceding claims. A method as in any above, implemented as a computer program. A method as in any above, implemented as a program of instructions stored (e.g., tangibly embodied) on a program storage device (e.g., at least one memory, at least one computer-readable medium) and executable by a computer (e.g., at least one processor). A method as in any above, further comprising one or more aspects of the exemplary embodiments of the invention as described further herein.

(8) In another exemplary embodiment of the invention, and as shown in FIG. 4, a computer-readable storage medium storing program instructions, execution of the program instructions resulting in operations comprising: receiving (401) a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perform at least one operation on the at least two ciphertexts and obtain a resulting ciphertext, where the refresh function operates to enable slow growth of the magnitude of noise for a ciphertext while maintaining the modulus of the ciphertext constant without using the secret key, where the encryption scheme enables homomorphic operations to be performed on ciphertexts encoded and operated on in accordance with the encryption scheme; performing (402) at least one operation on the first ciphertext and the second ciphertext, using the at least one operation function, to obtain a third ciphertext; and reducing (403) a noise level of the third ciphertext by using the refresh function.

A computer readable medium as in any above, further comprising one or more additional aspects of the exemplary embodiments of the invention as described herein.

(9) In a further exemplary embodiment of the invention, an apparatus comprising: at least one processor configured to receive a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perforin at least one operation on the at least two ciphertexts and obtain a resulting ciphertext, where the refresh function operates to enable slow growth of the magnitude of noise for a ciphertext while maintaining the modulus of the ciphertext constant without using the secret key, where the encryption scheme enables homomorphic operations to be performed on ciphertexts encoded and operated on in accordance with the encryption scheme; and at least one memory configured to store the first ciphertext and the second ciphertext, where the at least one processor is further configured to perform at least one operation on the first ciphertext and the second ciphertext, using the at least one operation function, to obtain a third ciphertext; and to reduce a noise level of the third ciphertext by using the refresh function.

An apparatus as in any above, further comprising one or more additional aspects of the exemplary embodiments of the invention as described herein.

(10) In another exemplary embodiment of the invention, an apparatus comprising: means for receiving (e.g., at least one input, at least one processor, at least one receiver) a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perform at least one operation on the at least two ciphertexts and obtain a resulting ciphertext, where the refresh function operates to enable slow growth of the magnitude of noise for a ciphertext while maintaining the modulus of the ciphertext constant without using the secret key, where the encryption scheme enables homomorphic operations to be performed on ciphertexts encoded and operated on in accordance with the encryption scheme; means for performing (e.g., at least one processor, at least one circuit, at least one function, at least one logic circuit, at least one integrated circuit) at least one operation on the first ciphertext and the second ciphertext, using the at least one operation function, to obtain a third ciphertext; and means for reducing (e.g., at least one processor, at least one circuit, at least one function, at least one logic circuit, at least one integrated circuit) a noise level of the third ciphertext by using the refresh function.

An apparatus as in any above, further comprising one or more additional aspects of the exemplary embodiments of the invention as described herein.

(11) In a further exemplary embodiment of the invention, an apparatus comprising: reception circuitry configured to receive a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perform at least one operation on the at least two ciphertexts and obtain a resulting ciphertext, where the refresh function operates to enable slow growth of the magnitude of noise for a ciphertext while maintaining the modulus of the ciphertext constant without using the secret key, where the encryption scheme enables homomorphic operations to be performed on ciphertexts encoded and operated on in accordance with the encryption scheme; operation circuitry configured to perform at least one operation on the first ciphertext and the second ciphertext, using the at least one operation function, to obtain a third ciphertext; and noise reduction circuitry (e.g., control circuitry) configured to reduce a noise level of the third ciphertext by using the refresh function.

An apparatus as in any above, further comprising one or more additional aspects of the exemplary embodiments of the invention as described herein.

(12) In another exemplary embodiment of the invention, an apparatus comprising: a first system configured to receive a first ciphertext and a second ciphertext, where the first ciphertext comprises first data encrypted in accordance with an encryption scheme and the second ciphertext comprises second data encrypted in accordance with the encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two ciphertexts and uses the public key to perform at least one operation on the at least two ciphertexts and obtain a resulting ciphertext, where the refresh function operates to enable slow growth of the magnitude of noise for a ciphertext while maintaining the modulus of the ciphertext constant without using the secret key, where the encryption scheme enables homomorphic operations to be performed on ciphertexts encoded and operated on in accordance with the encryption scheme; a second system configured to perform at least one operation on the first ciphertext and the second ciphertext, using the at least one operation function, to obtain a third ciphertext; and a third system configured to reduce a noise level of the third ciphertext by using the refresh function.

An apparatus as in any above, further comprising one or more additional aspects of the exemplary embodiments of the invention as described herein.

10. Additional Points

The exemplary embodiments of the invention, as discussed herein and as particularly described with respect to exemplary methods, may be implemented in conjunction with a program storage device (e.g., at least one memory, computer-readable memory, computer-readable medium, computer-readable storage medium, computer-readable storage device, non-transitory computer-readable medium such as memory, flash memory, magnetic memory devices, EEPROM, ROM, PROM, RAM, DRAM, SRAM, firmware, programmable logic, etc.) readable by a machine (e.g., a device, apparatus, at least one processor), tangibly embodying a program of instructions (e.g., program, computer program) executable (e.g., by the machine) for performing operations. The operations comprise steps of utilizing the exemplary embodiments or steps of the method.

The blocks shown in FIGS. 3 and 4 further may be considered to correspond to one or more functions and/or operations that are performed by one or more components, circuits, chips, apparatus, processors, computer programs and/or function blocks. Any and/or all of the above may be implemented in any practicable solution or arrangement that enables operation in accordance with the exemplary embodiments of the invention as desCribed herein.

In addition, the arrangement of the blocks depicted in FIGS. 3 and 4 should be considered merely exemplary and non-limiting. It should be appreciated that the blocks shown in FIGS. 3 and 4 may correspond to one or more functions and/or operations that may be performed in any order (e.g., any suitable, practicable and/or feasible order) and/or concurrently (e.g., as suitable, practicable and/or feasible) so as to implement one or more of the exemplary embodiments of the invention. In addition, one or more additional functions, operations and/or steps may be utilized in conjunction with those shown in FIGS. 3 and 4 so as to implement one or more further exemplary embodiments of the invention.

That is, the exemplary embodiments of the invention shown in FIGS. 3 and 4 may be utilized, implemented or practiced in conjunction with one or more further aspects in any combination (e.g., any combination that is suitable, practicable and/or feasible) and are not limited only to the steps, blocks, operations and/or functions shown in FIGS. 3 and 4.

Still further, the various names and/or symbols used for the parameters and/or functions are not intended to be limiting in any respect, as these parameters and functions may be identified by any suitable name and/or symbol.

Any use of the terms "connected," "coupled" or variants thereof should be interpreted to indicate any such connection or coupling, direct or indirect, between the identified elements. As a non-limiting example, one or more intermediate elements may be present between the "coupled" elements. The connection or coupling between the identified elements may be, as non-limiting examples, physical, electrical, magnetic, logical or any suitable combination thereof in accordance with the described exemplary embodiments. As non-limiting examples, the connection or coupling may comprise one or more printed electrical connections, wires, cables, mediums or any suitable combination thereof.

Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications will still fall within the scope of the teachings of the exemplary embodiments of the invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A non-transitory computer-readable storage medium for secure multiparty computation and communication and storing program instructions, execution of the program instructions resulting in operations comprising:
   receiving, over a network and as part of a secure multiparty computation and communication process, at a server computer system a query from a requestor computer system;
   performing, as part of the secure multiparty computation and communication process, a fully homomorphic encryption scheme allowing the server computer system to perform homomorphic operations on input ciphertexts without decrypting the ciphertexts and based on the query, to produce one or more results that when decrypted are an answer to the query, wherein performing the fully homomorphic encryption scheme comprises:
      accessing, at the server computer system and from a memory of the server computer system, a plurality of input ciphertexts, where each of the input ciphertexts comprises data encrypted in accordance with the fully homomorphic encryption scheme, where the fully homomorphic encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two given ciphertexts and uses the public key to perform at least one operation on the at least two given ciphertexts and obtain a resulting ciphertext, where the refresh function operates to prevent growth of a magnitude of noise for a provided ciphertext while reducing a modulus of the provided ciphertext without using the secret key, where the refresh function utilizes a modulus switching technique that comprises transforming the provided ciphertext c modulo q into another ciphertext c' modulo p while preserving correctness, where the modulus switching technique includes scaling by p/q and rounding, where p<q, where the fully homomorphic encryption scheme enables homomorphic operations to be performed on ciphertexts encoded and operated on in accordance with the fully homomorphic encryption scheme;
   determining, by the server computer system, from the plurality of input ciphertexts the one or more results corresponding to and satisfying the query by performing homomorphic operations using at least the plurality of input ciphertexts at least by:
      performing operations on ciphertexts according to a circuit that corresponds to the query and the evaluation of which produces the one or more results that satisfy the query, wherein the operations use the at least one operation function to obtain a ciphertext result, and wherein at least some of the operations involve the plurality of input ciphertexts;
      reducing a noise level of the ciphertext result by using the refresh function; and
      determining the one or more results of the evaluation of the circuit at least by evaluating the circuit and iterating the performing the operations and the reducing the noise level multiple times during the evaluation of the circuit; and
   completing the secure multiparty computation and communication process at least by sending by the server computer system and over the network the one or more results of the evaluation of the circuit to the requestor computer system.

2. The non-transitory computer-readable storage medium of claim 1, where application of the refresh function to the provided ciphertext also reduces a range of coefficients for an output of the refresh function, relative to a range of coefficients for the provided ciphertext.

3. The non-transitory computer-readable storage medium of claim 1, where the at least one operation comprises at least one of an addition and a multiplication, where in response to a multiplication being performed the refresh function is applied to an output of the multiplication.

4. The non-transitory computer-readable storage medium of claim 1, where the at least one operation comprises at least one of an addition and a multiplication, where in response to a multiplication being desired the refresh function is applied to at least one input of the multiplication.

5. The non-transitory computer-readable storage medium of claim 1, where the fully homomorphic encryption scheme enables evaluation of a polynomial depth circuit of multiplications and wherein the circuit that corresponds to the query comprises the polynomial depth circuit of multiplications.

6. A method for secure multiparty computation and communication, comprising:

receiving, over a network and as part of a secure multiparty computation and communication process, at a server computer system a query from a requestor computer system;

performing, as part of the secure multiparty computation and communication process, a fully homomorphic encryption scheme allowing the server computer system to perform homomorphic operations on input ciphertexts without decrypting the ciphertexts and based on the query, to produce one or more results that when decrypted are an answer to the query, wherein performing the fully homomorphic encryption scheme comprises:

accessing, at the server computer system and from a memory of the server computer system, a plurality of input ciphertexts, where each of the input ciphertexts comprises data encrypted in accordance with the fully homomorphic encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two given ciphertexts and uses the public key to perform at least one operation on the at least two given ciphertexts and obtain a resulting ciphertext, where the refresh function operates to prevent growth of a magnitude of noise for a provided ciphertext while reducing a modulus of the provided ciphertext without using the secret key, where the refresh function utilizes a modulus switching technique that comprises transforming the provided ciphertext c modulo q to another ciphertext c' modulo p while preserving correctness, where the modulus switching technique includes scaling by p/q and rounding, where p<q, where the fully homomorphic encryption scheme enables homomorphic operations to be performed on ciphertexts encoded and operated on in accordance with the fully homomorphic encryption scheme;

determining, by the server computer system, from the plurality of input ciphertexts the one or more results corresponding to and satisfying the query by performing homomorphic operations using at least the plurality of input ciphertexts at least by:

performing operations on ciphertexts according to a circuit that corresponds to the query and the evaluation of which produces the one or more results that satisfy the query, wherein the operations use the at least one operation function to obtain a ciphertext result, and wherein at least some of the operations involve the plurality of input ciphertexts;

reducing a noise level of the ciphertext result by using the refresh function; and determining the one or more results of the evaluation of the circuit at least by evaluating the circuit and iterating the performing the operations and the reducing the noise level multiple times during the evaluation of the circuit; and completing the secure multiparty computation and communication process at least by sending by the server computer system and over the network the one or more results of the evaluation of the circuit to the requestor computer system.

7. The method of claim 6, where application of the refresh function to the provided ciphertext also reduces a range of coefficients for an output of the refresh function, relative to a range of coefficients for the provided for the provided ciphertext.

8. The method of claim 6, where the at least one operation comprises at least one of an addition and a multiplication, where in response to a multiplication being performed the refresh function is applied to an output of the multiplication.

9. The method of claim 6, where the at least one operation comprises at least one of an addition and a multiplication, where in response to a multiplication being desired the refresh function is applied to at least one input of the multiplication.

10. The method of claim 6, where the encryption scheme enables evaluation of a polynomial depth circuit of multiplications and wherein the circuit that corresponds to the query comprises the polynomial depth circuit of multiplications.

11. An apparatus for secure multiparty computation and communication, comprising:

a memory configured to store a plurality of input ciphertexts and program code, at least one processor of a server computer system configured to cause the server computer system, in response to execution of the program code, to perform the following:

receive, over a network and as part of a secure multiparty computation and communication process, at the server computer system a query from a requestor computer system;

perform, as part of the secure multiparty computation and communication process, a fully homomorphic encryption scheme allowing the server computer system to perform homomorphic operations on the input ciphertexts without decrypting the ciphertexts and based on the query, to produce one or more results that when decrypted are an answer to the query, wherein performing the fully homomorphic encryption scheme comprises:

access at the server computer system the input ciphertexts from the memory, where each of the input ciphertexts comprises data encrypted in accordance with an encryption scheme, where the encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two given ciphertexts and uses the public key to perform at least one operation on the at least two given ciphertexts and obtain a resulting ciphertext, where the refresh function operates to prevent growth of a magnitude of noise for a provided ciphertext while reducing a modulus of the provided ciphertext without using the secret key, where the refresh function utilizes a modulus switching technique that comprises transforming the provided ciphertext c modulo q into another ciphertext c' modulo p while preserving correctness, where the modulus switching technique includes scaling by p/q and rounding, where p<q, where the encryption scheme enables homomorphic operations to be performed on ciphertexts encoded and operated on in accordance with the encryption scheme; and determine from the plurality of input ciphertexts the one or more results corresponding to and satisfying the query by perform homomorphic operations using at least the plurality of input ciphertexts at least by:

performing operations on ciphertexts according to a circuit that corresponds to the query and the evaluation of which produces the one or more results that satisfy the query, wherein the operations use the at least one operation function to obtain a ciphertext result, and wherein at least some of the operations involve the plurality of input ciphertexts; and reducing a noise level of the ciphertext result by using the refresh function; and determining the one or more results of the evaluation of the circuit at least by evaluating the circuit and iterating the performing the operations and the reducing the noise level multiple times during the evaluation of the circuit; and complete the secure multiparty computation and communication process at least by sending by the server computer system and over the network the one or more results of the evaluation of the circuit to the requestor computer system.

12. The apparatus of claim 11, where application of the refresh function to the provided ciphertext also reduces a range of coefficients for an output of the refresh function, relative to a range of coefficients for the provided ciphertext.

13. The apparatus of claim 11, where the at least one operation comprises at least one of an addition and a multiplication, where in response to a multiplication being performed the refresh function is applied to an output of the multiplication.

14. The apparatus of claim 11, where the at least one operation comprises at least one of an addition and a multiplication, where in response to a multiplication being desired the refresh function is applied to at least one input of the multiplication.

15. The apparatus of claim 11, where the fully homomorphic encryption scheme enables evaluation of a polynomial depth circuit of multiplications and wherein the circuit that corresponds to the query comprises the polynomial depth circuit of multiplications.

16. A method for secure multiparty computation and communication comprising:

receiving, over a network and as part of a secure multiparty computation and communication process, at a server computer system a query from a requestor computer system;

performing, as part of the secure multiparty computation and communication process, a fully homomorphic encryption scheme allowing the server computer system to perform homomorphic operations on input ciphertexts without decrypting the ciphertexts and based on the query, to produce one or more results that when decrypted are an answer to the query, wherein performing the fully homomorphic encryption scheme comprises:

accessing, at the server computer system and from a memory of the server computer system, a plurality of input ciphertexts, where each of the plurality of ciphertexts comprises data encrypted in accordance with the fully homomorphic encryption scheme, where the fully homomorphic encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two given ciphertexts and uses the public key to perform at least one operation on the at least two given ciphertexts and obtain a resulting ciphertext, where the refresh function operates to enable slow growth of a magnitude of noise for a provided ciphertext while maintaining a modulus of the provided ciphertext constant without using the secret key, where the fully homomorphic encryption scheme enables homomorphic operations to be performed on ciphertexts encoded and operated on in accordance with the fully homomorphic encryption scheme;

determining, by the server computer system, from the plurality of input ciphertexts the one or more results corresponding to and satisfying the query by performing homomorphic operations using at least the plurality of input ciphertexts at least by:

performing operations on ciphertexts according to a circuit that corresponds to the query and the evaluation of which produces the one or more results that satisfy the query, wherein the operations use the at least one operation function to obtain a ciphertext result, and wherein at least some of the operations involve the plurality of input ciphertexts;

reducing a noise level of the ciphertext result by using the refresh function; and determining the one or more results of evaluation of the circuit at least by evaluating the circuit and iterating the performing the operations and the reducing the noise level multiple times during the evaluation of the circuit; and completing the secure multiparty computation and communication process at least by sending by the server computer system and over the network the one or more results of the evaluation of the circuit to the requestor computer system.

17. The method of claim 16, where the modulus of the provided ciphertext is maintained at a value of 1.

18. The method of claim 16, where the magnitude of noise for the provided ciphertext is represented as a fractional part of coefficients for the ciphertext.

19. The method of claim 16, where the at least one operation comprises at least one of an addition and a multiplication, where in response to a multiplication being performed the refresh function is applied to an output of the multiplication.

20. The method of claim 16, where the fully homomorphic encryption scheme enables evaluation of a polynomial depth circuit of multiplications and wherein the circuit that corresponds to the query comprises the polynomial depth circuit of multiplications.

21. An apparatus for secure multiparty computation and communication, comprising:
one or more processors;
a memory comprising a plurality of input ciphertexts and program code,
wherein the one or more processors are configured, in response to execution of the program code, to cause the computer system to perform at least the following:
receiving, over a network and as part of a secure multiparty computation and communication process, at a server computer system a query from a requestor computer system;
performing, as part of the secure multiparty computation and communication process, a fully homomorphic encryption scheme allowing the server computer system to perform homomorphic operations on the input ciphertexts without decrypting the ciphertexts and based on the query, to produce one or more results that when decrypted are an answer to the query, wherein performing the fully homomorphic encryption scheme comprises:
accessing, by the server computer system and from the memory, the input ciphertexts, where each of the plurality of ciphertexts comprises data encrypted in accordance with the fully homomorphic encryption scheme, where the fully homomorphic encryption scheme uses a public key and a secret key and includes an encryption function, a decryption function, at least one operation function and a refresh function, where the encryption function operates to obtain ciphertext by encrypting data using the public key, where the decryption function operates using the secret key to decrypt ciphertext for data encrypted using the public key and obtain the data, where the at least one operation function receives at least two given ciphertexts and uses the public key to perform at least one operation on the at least two given ciphertexts and obtain a resulting ciphertext, where the refresh function operates to enable slow growth of a magnitude of noise for a provided ciphertext while maintaining a modulus of the provided ciphertext constant without using the secret key, where the fully homomorphic encryption scheme enables homomorphic operations to be performed on ciphertexts encoded and operated on in accordance with the fully homomorphic encryption scheme;
determining, by the server computer system, from the plurality of input ciphertexts the one or more results corresponding to and satisfying the query by performing homomorphic operations using at least the plurality of input ciphertexts at least by:
performing operations on ciphertexts according to a circuit that corresponds to the query and the evaluation of which produces the one or more results that satisfy the query, wherein the operations use the at least one operation function to obtain a ciphertext result, and wherein at least some of the operations involve the plurality of input ciphertexts;
reducing a noise level of the ciphertext result by using the refresh function; and
determining the one or more results of evaluation of the circuit at least by evaluating the circuit and iterating the performing the operations and the reducing the noise level multiple times during the evaluation of the circuit; and
completing the secure multiparty computation and communication process by at least by sending by the server computer system and over the network the one or more results of the evaluation of the circuit to the requestor computer system.

22. The apparatus of claim 21, where the modulus of the provided ciphertext is maintained at a value of 1.

23. The apparatus of claim 21, where the at least one operation comprises at least one of an addition and a multiplication, where in response to a multiplication being performed the refresh function is applied to an output of the multiplication.

24. The apparatus of claim 21, where the fully homomorphic encryption scheme enables evaluation of a polynomial depth circuit of multiplications and wherein the circuit that corresponds to the query comprises the polynomial depth circuit of multiplications.

25. The apparatus of claim 21, where the magnitude of noise for the provided ciphertext is represented as a fractional part of coefficients for the ciphertext.

* * * * *